US012578922B2

(12) United States Patent
Mahler-Haug et al.

(10) Patent No.: US 12,578,922 B2
(45) Date of Patent: *Mar. 17, 2026

(54) NATURAL LANGUAGE PROCESSING PLATFORM FOR AUTOMATED EVENT ANALYSIS, TRANSLATION, AND TRANSCRIPTION VERIFICATION

(71) Applicant: Allstate Insurance Company, Northbrook, IL (US)

(72) Inventors: Olivia Mahler-Haug, Chicago, IL (US); Connor Walsh, Lake Forest, IL (US); Geoff Colgan, Arlington Heights, IL (US); Matthew Cluck, Schaumburg, IL (US); Ross Kirk Eley, Belfast (IE); Harideep Yeddula, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,751

(22) Filed: Apr. 1, 2024

(65) Prior Publication Data

US 2024/0354054 A1     Oct. 24, 2024

Related U.S. Application Data

(63) Continuation of application No. 16/874,086, filed on May 14, 2020, now Pat. No. 11,947,872.

(Continued)

(51) Int. Cl.
*G06F 3/16* (2006.01)
*G06F 3/0482* (2013.01)
(Continued)

(52) U.S. Cl.
CPC ............ *G06F 3/167* (2013.01); *G06F 3/0482* (2013.01); *G10L 15/02* (2013.01); *G10L 15/04* (2013.01);
(Continued)

(58) Field of Classification Search
CPC ........ G06F 3/167; G06F 3/0482; G06F 40/30; G10L 15/02; G10L 15/04; G10L 15/08;
(Continued)

(56) References Cited

U.S. PATENT DOCUMENTS 9,318,110 B2 *   4/2016   Roe ......................... G10L 15/26
9,772,816 B1 *   9/2017   Bigham ................... G06F 3/167
(Continued)

*Primary Examiner* — Mark Villena
(74) *Attorney, Agent, or Firm* — Akerman LLP

(57) ABSTRACT

Aspects of the disclosure relate to computing platforms that utilize improved natural language processing techniques for claims processing. A computing platform may receive an audio file and determine one or more utterance segments based on the audio file. The computing platform may generate and send one or more audio chunks based on the one or more utterance segments to an audio transcription system. The computing platform may receive one or more text segments in response and may generate an audio transcription file accordingly. The computing platform may assign a category to each word in the audio transcription file, and may send user interface information to a user device along with one or more commands directing the user device to generate a user interface based on the user interface information, which may cause the user device to display the user interface.

20 Claims, 22 Drawing Sheets

405

Adjuster Interface

Loss investigation from: PERSON #1

Transcript (▶)

Contact Details (1)   Loss Details (2)   Next Steps (3)   Other (4)

Preamble (4)

| Speaker | Time | Text |
|---------|------|------|
| Rep. | 4:01 | How may I help? |
| Caller | 4:04 | I'm calling for my daughter. <u>The other day she accidentally backed and kind of slid into my car with her truck.</u> |
| ... | ... | ... |

Related U.S. Application Data

(60) Provisional application No. 62/945,500, filed on Dec. 9, 2019, provisional application No. 62/929,528, filed on Nov. 1, 2019.

(51) Int. Cl.

| | |
|---|---|
| *G10L 15/02* | (2006.01) |
| *G10L 15/04* | (2013.01) |
| *G10L 15/08* | (2006.01) |
| *G10L 15/14* | (2006.01) |
| *G10L 15/22* | (2006.01) |
| *G10L 15/26* | (2006.01) |

(52) U.S. Cl.

CPC .............. *G10L 15/08* (2013.01); *G10L 15/14* (2013.01); *G10L 15/22* (2013.01); *G10L 15/26* (2013.01)

(58) Field of Classification Search

CPC ......... G10L 15/14; G10L 15/22; G10L 15/26; G06Q 10/10; G06Q 30/01; G06Q 40/08

See application file for complete search history.

(56) References Cited

U.S. PATENT DOCUMENTS

| | | | |
|---|---|---|---|
| 11,017,778 | B1 | 5/2021 | Thomson |
| 11,947,872 | B1* | 4/2024 | Mahler-Haug .......... G10L 15/08 |
| 2010/0268535 | A1* | 10/2010 | Koshinaka .............. G10L 15/06 |
| | | | 704/E15.003 |
| 2014/0052480 | A1 | 2/2014 | Bell |
| 2015/0161985 | A1* | 6/2015 | Peng ....................... G10L 15/26 |
| | | | 704/235 |
| 2017/0092262 | A1* | 3/2017 | Pinhasi ................... G10L 15/02 |
| 2017/0249425 | A1* | 8/2017 | Narayanaswamy ......................... G06F 21/6209 |
| 2018/0090131 | A1 | 3/2018 | Mangalath |
| 2018/0107734 | A1 | 4/2018 | Galia |
| 2019/0258704 | A1 | 8/2019 | Mertens |
| 2020/0152302 | A1* | 5/2020 | Co .......................... G16H 70/20 |
| 2020/0192862 | A1 | 6/2020 | Tsai |
| 2020/0357408 | A1* | 11/2020 | Boekweg ................ G10L 15/26 |
| 2021/0383913 | A1 | 12/2021 | Tablan |

* cited by examiner

102

111

112

113

Natural Language Processing Platform

Processor(s)

Memory(s)

Natural Language Processing Module
112a

Natural Language Processing Database
112b

Machine Learning Engine
112c

Communication Interface(s)

405

505

605

705

1005

Adjuster Interface

Please note: the transcript you are about to view has been flagged as containing one or more sections of non-English text.  Please focus on the English portions for now.  We appreciate your patience as we work to translate the remaining portions.

Audio Transcription Interface

| Speaker | Time | Text |
|---------|------|------|
| Rep. | 4:01 | How may I help? |
| Caller | 4:04 | Summer farmhouse pickle loop. |
| ... | ... | ... |

Audio Transcription Interface

| <u>Speaker</u> | <u>Time</u> | <u>Text</u> |
|----------------|-------------|-------------|
| Rep. | 4:01 | How may I help? |
| Caller | 4:04 | My daughter backed into my car. |
| ... | ... | ... |

FIG. 12

NATURAL LANGUAGE PROCESSING PLATFORM FOR AUTOMATED EVENT ANALYSIS, TRANSLATION, AND TRANSCRIPTION VERIFICATION

CROSS REFERENCE TO RELATED APPLICATIONS

This application is a continuation of U.S. application Ser. No. 16/874,086, filed May 14, 2020, which claims the benefit of and priority to U.S. Prov. Pat. 62/929,528, filed Nov. 1, 2019, and entitled "Natural Language Processing Platform for Automated Event Analysis," and U.S. Prov. Pat. 62/945,500, filed Dec. 9, 2019, and entitled "Natural Language Processing Platform for Automated Translation and Transcription Verification." The content of these applications is incorporated herein by reference in its entirety.

BACKGROUND

Aspects of the disclosure relate to enhanced processing systems for performing natural language processing. Many organizations and individuals rely on claim processing services to determine fault and provide compensation accordingly. In many instances, however, claim processing may be inefficient due to extensive manual review of the claims. There remains an ever-present need to develop improved methods of improving claim analysis using natural language processing.

In addition, many organizations and individuals rely on call processing services from a variety of call center settings. For example, they may rely on claim processing services to determine fault and provide compensation accordingly. In many instances, however, claim processing may be inefficient due to the use of foreign languages during a claim processing call. There remains an ever-present need to develop improved methods of handling the use of foreign languages during such calls.

SUMMARY

Aspects of the disclosure provide effective, efficient, scalable, and convenient technical solutions that address and overcome the technical problems associated with the processing of calls (e.g., such as claims processing calls). In accordance with one or more arrangements discussed herein, a computing platform having at least one processor, a communication interface, and memory may determine one or more utterance segments based on a received audio file. The computing platform may send one or more audio chunks based on the one or more utterance segments to an audio transcription system. The computing platform may receive one or more text segments in response to the one or more audio chunks. Based on the one or more text segments, the computing platform may generate an audio transcription file. The computing platform may assign a category to each word in the audio transcription file. The computing platform may send user interface information, generated based on the category assigned to each word in the audio transcription file, to a user device along with one or more commands directing the user device to generate a user interface based on the user interface information, which may cause the user device to generate and display the user interface.

In one or more instances, the computing platform may identify, in the audio transcription file, personal information, which may be credit card information, bank account information, a social security number, driver's license information, or a tax identifier. The computing platform may redact the personal information from the audio transcription file and the one or more audio chunks, which may be linked to the audio transcription file.

In one or more instances, the computing platform may identify a claim number in the audio transcription file by: 1) determining that a number in the audio transcription file matches a pattern corresponding to a claim number based on one or more of: a number of digits, a digit pattern, or a character pattern, 2) extracting a segment from the audio transcription file corresponding to a predetermined character length window, 3) analyzing the extracted segment to identify that a length of numbers included in the extracted segment is greater than or equal to an amount of numbers in a claim number, and 4) eliminating identified repetition in the extracted segment until the length of numbers is reduced to the amount of numbers in the claim number.

In one or more instances, the claim number may be broken up by one or more words and the computing platform may identify the claim number by determining, based on the length of numbers, that the extracted segment contains the claim number. In one or more instances, the computing platform may be configured to implement logic to interpret number variations in the audio transcription file. In these instances, the number variations may be leading zeros or varied number pronunciations.

In one or more instances, the received audio file may include a first channel and a second channel. In these instances, the first channel may include speech from a first individual and the second channel may include speech from a second individual. In one or more instances, the generated one or more audio chunks may include a first subset and a second subset. In these instances, the first subset of the one or more audio chunks may include speech and the second subset of the one or more audio chunks may include silence. Further, in these instances, the computing platform may send the first subset of the one or more audio chunks without sending the second subset of the one or more audio chunks.

In one or more instances, each of the one or more text segments may contain text corresponding to at least one of the one or more audio chunks. In these instances, the one or more text segments may be generated by simultaneous processing of the one or more audio chunks. Further, in these instances, each of the one or more text segments may include one or more embedded timestamps or speaker identifiers. Further, in these instances, the one or more text segments may be received in real time as they are generated.

In one or more instances, the computing platform may generate the audio transcription file by: 1) stitching together the one or more text segments using the one or more embedded timestamps or speaker identifiers, and 2) linking each of the one or more text segments to one or more corresponding audio chunks, where a user input received at a portion of the audio transcription file corresponding to a particular text segment may result in audio output of one or more particular audio chunks used to generate the particular text segment.

In one or more instances, the computing platform may assign the categories to each word in the audio transcription file by, for each word: 1) computing, using a transfer learning model, a probability that the word corresponds to each of a plurality of categories, wherein the plurality of categories comprises: preamble, loss details, injury, damages, contact details, next steps, sign off, or other, 2) generating a vector including the computed probabilities that the word corresponds to each of the plurality of categories, 3) assigning, to the word, a category corresponding to a largest computed probability included in the vector, and 4) tagging the word with an indication of the assigned category.

In one or more instances, the computing platform may tag, within the audio transcription file, one or more sections, where each of the one or more tagged sections includes words corresponding to a common category. In one or more instances, the computing platform may modify an assigned category of a word based on a category of one or more adjacent words.

In one or more instances, each of the plurality of categories may correspond to a priority value, the computing platform may and assign the category to the word based, at least in part, on the priority value. In one or more instances, the computing platform may generate, for each of the plurality of categories, a count, where the counts correspond to a number of times in the audio transcription file a word in the corresponding category appears.

In one or more instances, the computing platform may identify, using the audio transcription file, one or more of: a call type, a loss location, or additional participants corresponding to the audio transcription file. In one or more instances, sending the one or more commands directing the user device to generate the user interface based on the user interface information may cause the user device to generate and display an interface that includes: 1) a line by line script indicating words spoken by a particular speaker, an indication of the particular speaker, and a time at which the words were spoken, and 2) a series of selectable objects each corresponding to one of a plurality of categories, where selection of one of the selectable objects causes words in the line by line script, which correspond to a category of the one of the selectable objects, to be emphasized. In one or more instances, the received audio file may be a live audio stream, and the user interface may be displayed in real time during the live audio stream.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

Figure 1A:
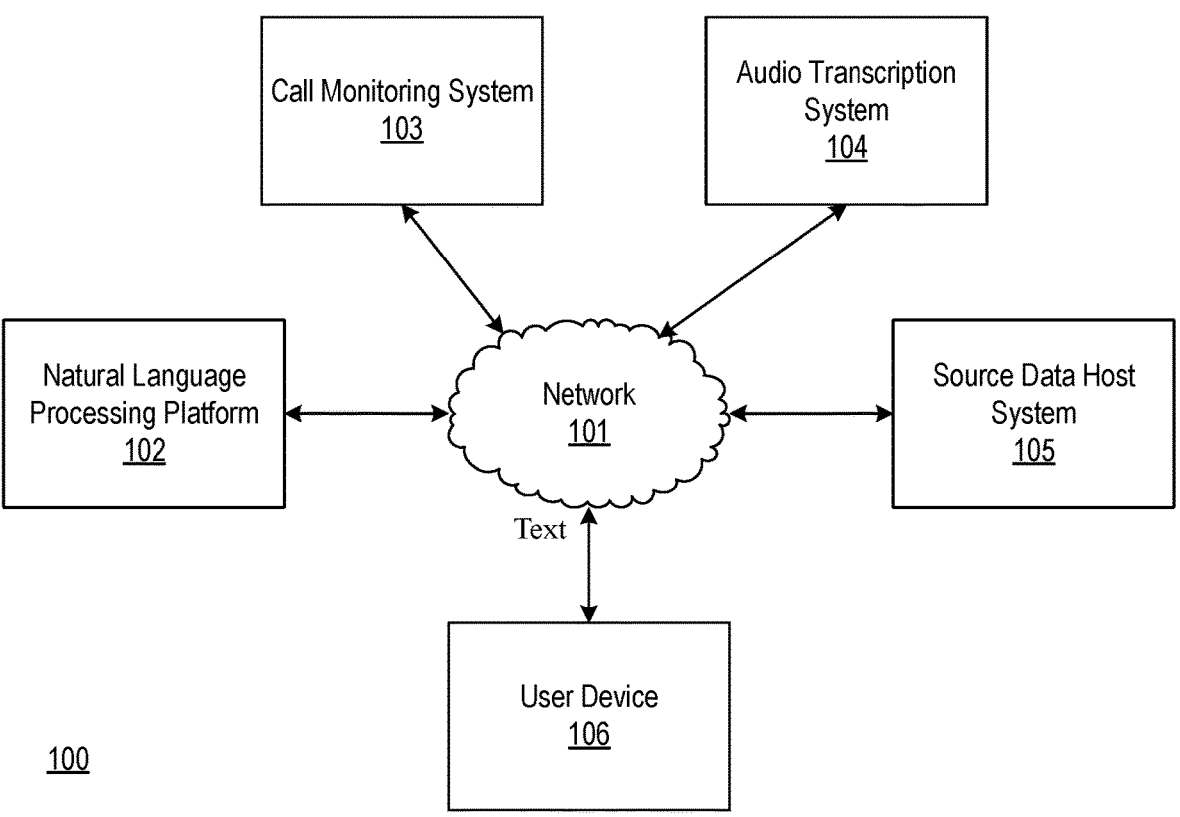
FIGS. 1A-1B depict an illustrative computing environment for automating claim analysis and performing claim transcription/translation using improved natural language processing techniques in accordance with one or more example arrangements discussed herein.

4 guage processing techniques in accordance with one or more example arrangements discussed herein; and FIGS. 10-12 depict illustrative user interfaces for performing claim transcription and translation using improved natural language processing techniques in accordance with one or more example arrangements discussed herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief summary, the present disclosure provides systems and methods for leveraging natural language processing (NLP) techniques to facilitate processing of calls (e.g., such as calls related to claim processing). In short, a computing platform may use a model to categorize the content of call recordings (e.g., such as claim call recordings) in order to assist users (which may e.g., be any type of user or individuals such as, for example, insurance claim adjusters) in quickly identifying the most relevant information. The computing platform may train the model on hand-transcribed and annotated files in production, with a feedback loop from the users to retrain in the future. For example, only a quarter of the time spent on a particular claim call may relate to details of the loss. By flagging these details and removing them from the remainder of a transcript for a recording, individuals (e.g., insurance claim adjusters) may have a significantly easier time in determining the loss details and processing the claim. For at least similar reasons, it may be possible to partially or fully automate the claim processing using the methods and systems described herein.

More specifically, the computing platform may build the model using supervised deep learning using, for example, a recurrent neural network (RNN) such as a stacked single gates recurrent units (GRU) neural net and/or a long short-term memory (LSTM) neural net with supplemented embeddings leveraging transfer learning, which may allow the computing platform to leverage the power of a more general NLP model while customizing the model as well. The computing platform may standardize data through pre-processing (e.g., conversion to a word-level array, standardizing spellings of words, removal of special characters, tokenization, removal of stop words, application of model embeddings, or the like). Further, the computing platform may overlay a smoothing function on predictions of the model to enforce contiguous sections and improve the user experience.

In doing so, the resulting output may be a user interface that may be presented to an individual such as, for example, a claim adjuster that categorizes sections of the transcript based on topics such as "loss details," "pre-amble." "contact details," "next steps," or the like, to facilitate case of review and/or enable automated claim processing.

Furthermore, the systems and methods described herein facilitate translation and/or transcription verification. For example, in some instances, a claim adjuster may know upfront what language a customer may prefer to communicate in (e.g., may be a repeat customer, the customer may have been previously prompted for a language preference by an automated system, or the like). However, if these preferences are not known in advance, transcription of the call may cause problems. For example, in some instances, a translator, friend, or family member may be used to facilitate a discussion between a customer speaking a first language and a representative/claim adjuster speaking a second language. In these instances, a recording of this conversation may contain speech from both the first language and the second language. This may complicate the transcription process for this recording, and thus ultimately may complicate the claim processing.

Accordingly, the systems and methods described herein facilitate such transcription to maximize accuracy. For example, in some instances, the computing platform may use natural language processing to determine that all or a portion of the transcript appears to be nonsensical based on an unintelligible translation, and thus may determine that a portion or the entirety of the recording was spoken using an unanticipated language. The computing platform may isolate the necessary portions, attempt to determine a proper language for the portions, and send them for transcription using a model associated with the proper language. The computing platform may then receive these portions of text, transcribe these portions using the proper language, and translate these portions of text into the original, anticipated language. Finally, the computing platform may stitch together the transcribed/translated portions of text with any original text that was adequately transcribed to generate a transcript that contains the entirety of the recording regardless of the fact that foreign and/or multiple languages may have been used in creation of the recording. In some instances, the computing platform may receive feedback (e.g., from an individual via the user interface), and may update one or more machine learning datasets associated with the categorizations of words in the transcripts and/or language determinations to further improve the capabilities of the various models.

Accordingly, by extracting these text segments, the computing platform may save time spent in manual claim review, and may facilitate automation of the claim processing. Furthermore, the computing platform may increase transcription accuracy by recognizing incorrect transcription (e.g., due to transcription in an incorrect language). Accordingly, the disclosure presented herein provides technical solutions to the technical problems associated with inefficiencies of current claim processing techniques.

Figure 1B:
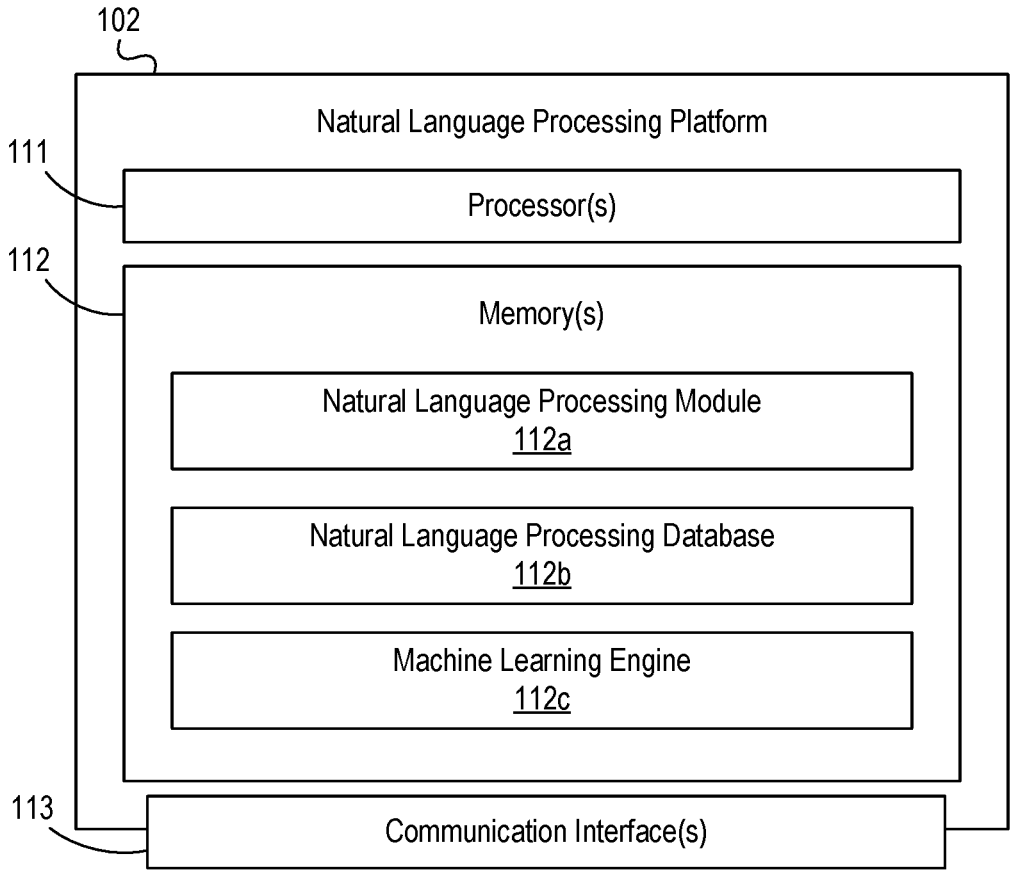

FIGS. 1A and 1B depict an illustrative computing environment for automating claim analysis and performing claim transcription and translation using improved natural language processing techniques in accordance with one or more example embodiments. Referring to FIG. 1A, computing environment 100 may include one or more computer systems. For example, computing environment 100 may include natural language processing platform 102, call monitoring system 103, audio transcription system 104, source data host system 105, and user device 106.

As illustrated in greater detail below, natural language processing platform 102 may include one or more computing devices configured to perform one or more of the functions described herein. For example, natural language processing platform 102 may include one or more computers (e.g., laptop computers, desktop computers, servers, server blades, or the like). In one or more instances, natural language processing platform 102 may be configured to perform natural language processing techniques to categorize elements of a transcript and/or to parse and determine additional data included in the transcript. In one or more instances, the natural language processing platform 102 may be associated with an organization or entity (e.g., a claim processing/insurance agency, or the like). In some instances, natural language processing platform 102 may be a platform specifically designed to perform natural language processing of claim call recordings.

Call monitoring system 103 may be a computing device configured to monitor and record calls (telephonic, video, voice over internet protocol, or the like) for further analysis. In one or more instances, call monitoring system 103 may be configured with one or more microphones to enable recording capabilities. In some instances, call monitoring system 103 may be a computing device (server, server blade, or the like) that is configured to record and transmit such recordings to another computing device (e.g., natural language processing platform 102). In one or more instances, the call monitoring system 103 may comprise a single computing device. In other instances, the call monitoring system 103 may comprise multiple devices. In one or more instances, the call monitoring system 103 may be associated with an organization or entity (e.g., a claim processing/insurance agency, or the like).

Audio transcription system 104 may be a computing system configured to receive audio files and transcribe them into text files. In some instances, the audio transcription system 104 may be maintained by the same company or organization associated with the natural language processing platform 102. In other instances, the audio transcription system 104 may be maintained by a different company or organization than that associated with the natural language processing platform 102. For example, the audio transcription system 104 may be maintained and operated by a third party transcription vendor. In one or more instances, the audio transcription system 104 may be a computing device configured with transcription and word processing capabilities. In these instances, the audio transcription system 104 may be a laptop computer, desktop computer, tablet computer, smartphone, server, server blade, or the like.

Source data host system 105 may be a computing platform capable of storing and maintaining various information corresponding to one or more clients of an organization (e.g., a claim processing/insurance company), claims, events (e.g., telematics data corresponding to a driving event, or the like). In some instances, the source data host system 105 may store data related to a particular client, such as whether they have any ongoing claims, personal information, or the like. Additionally or alternatively, the source data host system 105 may store data related to a claim, such as other parties involved in the claim, details of the claim, or the like. Additionally or alternatively, the source data host system 105 may be configured to receive telematics data from one or more telematics sensor devices, and may store the telematics data along with a particular claim. Additionally or alternatively, source data host system 105 may be a sensor device such as a speedometer, accelerometer, other telematics sensor, camera, or the like. Although FIG. 1A illustrates a single source data host system 105, it should be understood that there may be multiple source data host systems 105 in the computing environment 100.

User device 106 may be a computing device (e.g., a desktop computer, laptop computer, tablet computer, smart phone, or the like) that may be used (e.g., by a representative of an organization such as an insurance company) to evaluate and process claims. It should be understood that user device 106 is not necessarily usable exclusively by a claim adjuster. Rather, user device 106 may be a user device configured for use by a variety of users. In one or more instances, the user device 106 may be a computing device configured to receive information (e.g., from the natural language processing platform 102) and to generate/display graphical user interfaces accordingly. In some instances, the user device 106 may be used by a claim adjuster for claim processing.

Computing environment 100 also may include one or more networks, which may interconnect one or more of natural language processing platform 102, call monitoring system 103, audio transcription system 104, source data host system 105, user device 106, or the like. For example, computing environment 100 may include a network 101 (which may, e.g., interconnect natural language processing platform 102, call monitoring system 103, audio transcription system 104, source data host system 105, and user device 106).

In one or more arrangements, natural language processing platform 102, call monitoring system 103, audio transcription system 104, source data host system 105, user device 106, and/or the other systems included in computing environment 100 may be any type of computing device capable of displaying a user interface, receiving input using the user interface, and communicating the received input to one or more other computing devices. For example, natural language processing platform 102, call monitoring system 103, audio transcription system 104, source data host system 105, user device 106, and/or the other systems included in computing environment 100 may, in some instances, be and/or include server computers, desktop computers, laptop computers, tablet computers, smart phones, sensors, or the like that may include one or more processors, memories, communication interfaces, storage devices, and/or other components. As noted above, and as illustrated in greater detail below, any and/or all of natural language processing platform 102, call monitoring system 103, audio transcription system 104, source data host system 105, and user device 106 may, in some instances, be special-purpose computing devices configured to perform specific functions.

Referring to FIG. 1B, natural language processing platform 102 may include one or more processors 111, memory 112, and communication interface 113. A data bus may interconnect processor 111, memory 112, and communication interface 113. Communication interface 113 may be a network interface configured to support communication between natural language processing platform 102 and one or more networks (e.g., network 101, or the like). Memory 112 may include one or more program modules having instructions that when executed by processor 111 cause natural language processing platform 102 to perform one or more functions described herein and/or one or more databases that may store and/or otherwise maintain information which may be used by such program modules and/or processor 111. In some instances, the one or more program modules and/or databases may be stored by and/or maintained in different memory units of natural language processing platform 102 and/or by different computing devices that may form and/or otherwise make up natural language processing platform 102. For example, memory 112 may have, store, and/or include natural language processing module 112a, a natural language processing database 112b, and a machine learning engine 112c. Natural language processing platform 102 may have instructions that direct and/or cause natural language processing platform 102 to execute advanced natural language claim processing techniques, as discussed in greater detail below. Natural language processing database 112b may store information used by natural language processing module 112a and/or natural language processing platform 102 in claim analysis, claim processing, and/or in performing other functions. Machine learning engine 112c may have instructions that direct and/or cause the natural language processing platform 102 to perform claim analysis, claim processing, and to set, define, and/or iteratively refine optimization rules and/or other parameters used by the natural language processing platform 102 and/or other systems in computing environment 100.

Figure 2A:
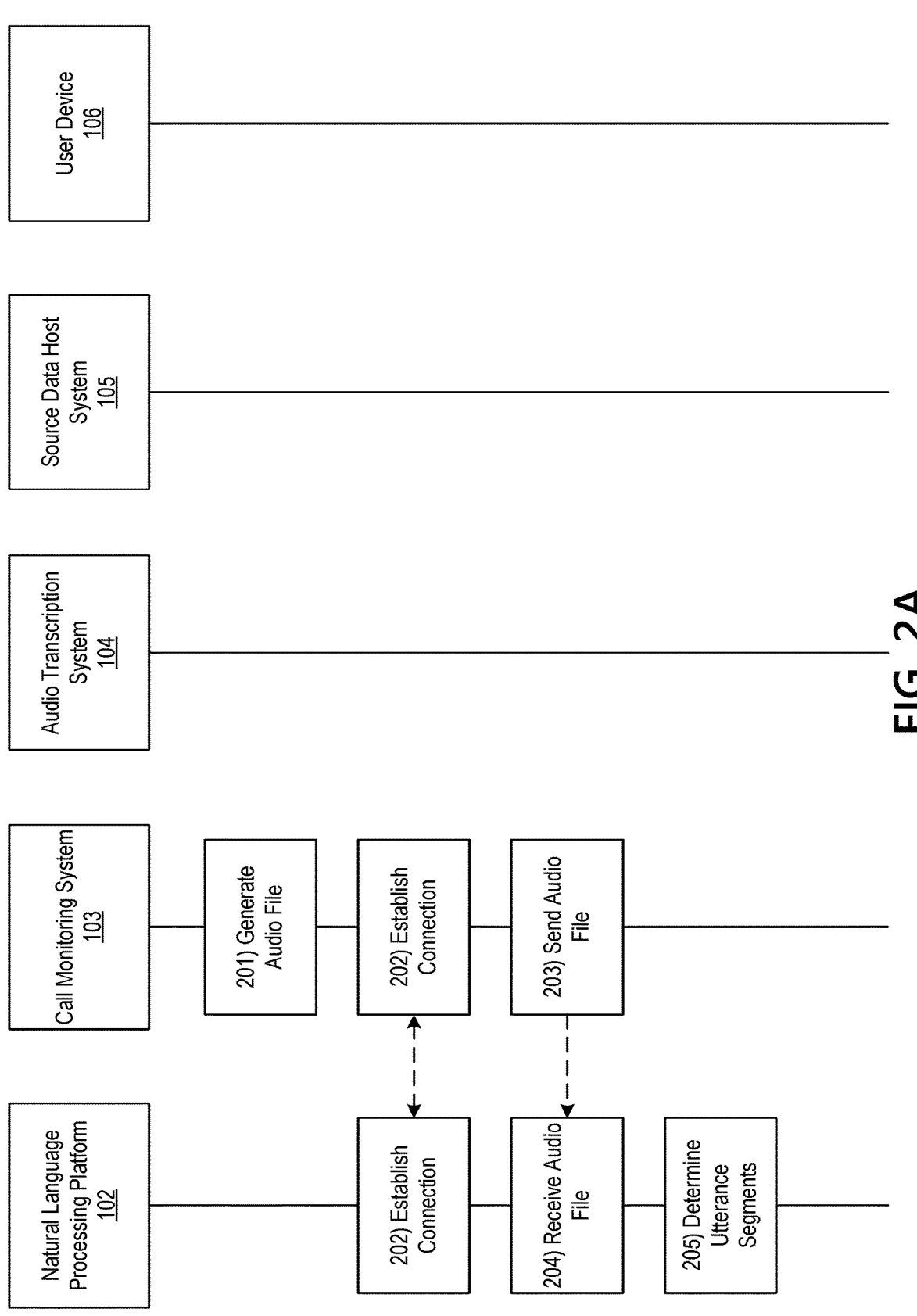
FIGS. 2A-2G depict an illustrative event sequence for automating claim analysis using improved natural language processing techniques in accordance with one or more example arrangements discussed herein.

FIGS. 2A-2G depict an illustrative event sequence for enhanced and optimized claim analysis using improved natural language processing techniques in accordance with one or more example embodiments. Referring to FIG. 2A, at step 201, the call monitoring system 103 may generate an audio file. For example, in generating the audio file, the call monitoring system 103 may record a conversation (e.g., between a customer and an agent, or the like) over one of a plurality of mediums (e.g., telephone, voice over internet protocol, video conference, or the like). In these instances, the call monitoring system 103 may receive a permission indication from a user device and may record the calls based on receipt of the permission indication. In these instances, the call monitoring system 103 may record the audio file over multiple channels. For example, the call monitoring system 103 may record the audio file over a first channel for the customer and a second channel for the agent. The call monitoring system 103 may then combine the audio from the first channel and the second channel to generate the audio file. By recording the audio file over speaker specific channels, call monitoring system 103 may avoid speaker interference in generation of the audio file. In one or more instances, in generating the audio file, the call monitoring system 103 may generate an audio file corresponding to a conversation between a customer and an agent regarding an insurance claim.

At step 202, the call monitoring system 103 may establish a connection with the natural language processing platform 102. In one or more instances, call monitoring system 103 may establish a first wireless data connection with the natural language processing platform 102 to link the call monitoring system 103 to the natural language processing platform 102. In one or more instances, the call monitoring system 103 may determine whether or not a connection was previously established with the natural language processing platform 102. If the call monitoring system 103 determines that a connection was previously established, it might not attempt to re-establish the first wireless data connection. If, however, the call monitoring system 103 determines that the connection was not previously established, it may proceed to establish the first wireless data connection as described herein.

At step 203, the call monitoring system 103 may send, share, or otherwise provide the audio file, generated at step 201, to the natural language processing platform 102. In one or more instances, the call monitoring system 103 may send the audio file to the natural language processing platform 102 while the first wireless data connection is established.

At step 204, natural language processing platform 102 may receive the audio file sent at step 203. In one or more instances, the natural language processing platform 102 may receive the audio file via the communication interface 113 and while the first wireless data connection is established. After receiving the audio file, the natural language processing platform 102 may store the audio file, for example, in the natural language processing database 112b. In one or more instances, rather than receiving merely an audio file, the natural language processing platform 102 may receive a video file (e.g., from a video conference, or the like) and may separate the audio file from the video file.

At step 205, the natural language processing platform 102 may determine one or more utterance segments in the audio file. For example, in determining the one or more utterance segments in the audio file, the natural language processing platform 102 may determine natural breaks in conversation, sentences, phrases, or the like, that may be isolated from the remainder of the audio file.

Figure 2B:
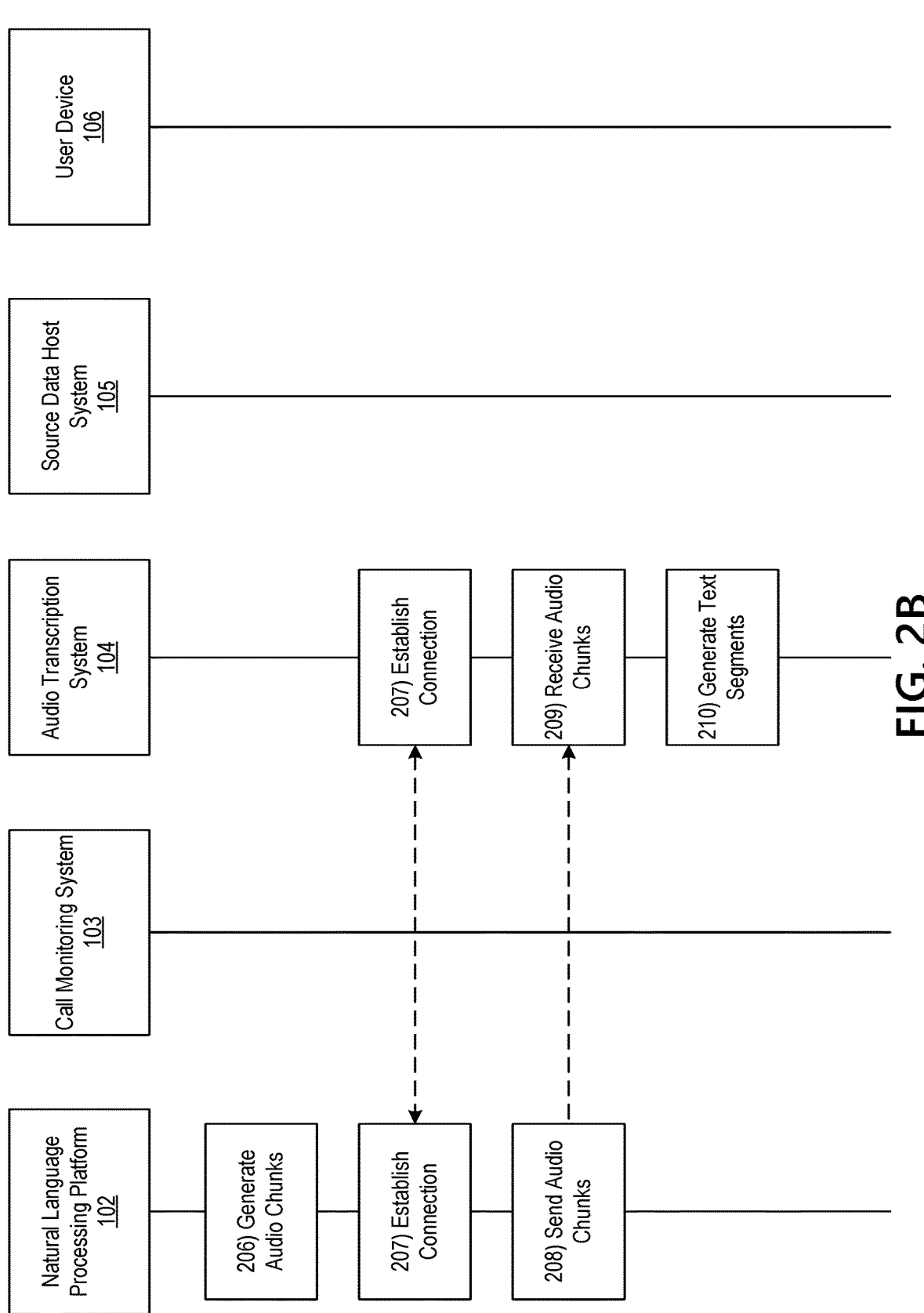

Referring to FIG. 2B, at step 206, the natural language processing platform 102 may generate one or more audio chunks, each corresponding to one of the utterance segments determined at step 205 ("audio chunk" should be considered a term of art, and as used herein will be readily understood by those having ordinary skill in the art). In doing so, the natural language processing platform 102 may allow for more efficient and cost effective processing of the audio file by removing roughly 20-40% of the audio file (e.g., that corresponds to silence) before sending the audio file for transcription. By reducing the larger audio file into multiple smaller files, each file may be processed for transcription at a significantly faster speed.

Furthermore, in generating the audio chunks, the natural language processing platform 102 may generate one or more silent audio chunks (e.g., corresponding to a pause in the conversation). In these instances, the natural language processing platform 102 may determine the silent chunks by determining that a power level (e.g., volume) associated with the audio file drops below a predetermined power threshold for a predetermined period (e.g., 3 seconds, or the like). In some instances, the predetermined period may be automatically determined by the natural language processing platform 102. In other instances, the predetermined period may be determined based on a received user input.

At step 207, the natural language processing platform 102 may establish a connection with the audio transcription system 104. In one or more instances, the natural language processing platform 102 may establish a second wireless data connection with the audio transcription system 104 to link the natural language processing platform 102 to the audio transcription system 104. In one or more instances, the natural language processing platform 102 may determine whether a connection was previously established with the audio transcription system 104. If the natural language processing platform 102 did previously establish a connection with the audio transcription system 104, the natural language processing platform 102 might not try to re-establish the second wireless data connection. If, however, the natural language processing platform 102 did not previously establish a connection with the audio transcription system 104, the natural language processing platform 102 may establish the second wireless data connection as described herein.

At step 208, the natural language processing platform 102 may send, share, or otherwise provide the audio chunks, generated at step 206, to the audio transcription system 104. In one or more instances, the natural language processing platform 102 may send the audio chunks to the audio transcription system 104 via the communication interface 113 and while the second wireless data connection is established. In one or more instances, in sending the audio chunks, the natural language processing platform 102 might not send the silent chunks.

At step 209, the audio transcription system 104 may receive, or otherwise access, the audio chunks sent at step

208. In one or more instances, the audio transcription system 104 may receive the audio chunks while the second wireless data connection is established. As described above, in receiving the audio chunks, the audio transcription system 104 might not receive silent chunks, and may receive a plurality of audio files each truncated to include a particular utterance from the original audio file.

At step 210, the audio transcription system 104 may generate text segments each corresponding to a single audio chunk received at step 209. For example, each text segment may correspond to a particular utterance segment, as determined at step 205. Additionally or alternatively, the audio transcription system 104 may generate text segments that contain multiple chunks. In generating the text segments, the audio transcription system 104 may perform transcription on a plurality of the audio chunks simultaneously. Accordingly, the audio transcription system 104 may efficiently perform transcription of the audio chunks in a method that may be faster than transcribing the entire audio file as a single file. In one or more instances, the audio transcription system 104 may embed timestamps and/or speaker identifiers into the text segments.

Figure 2C:
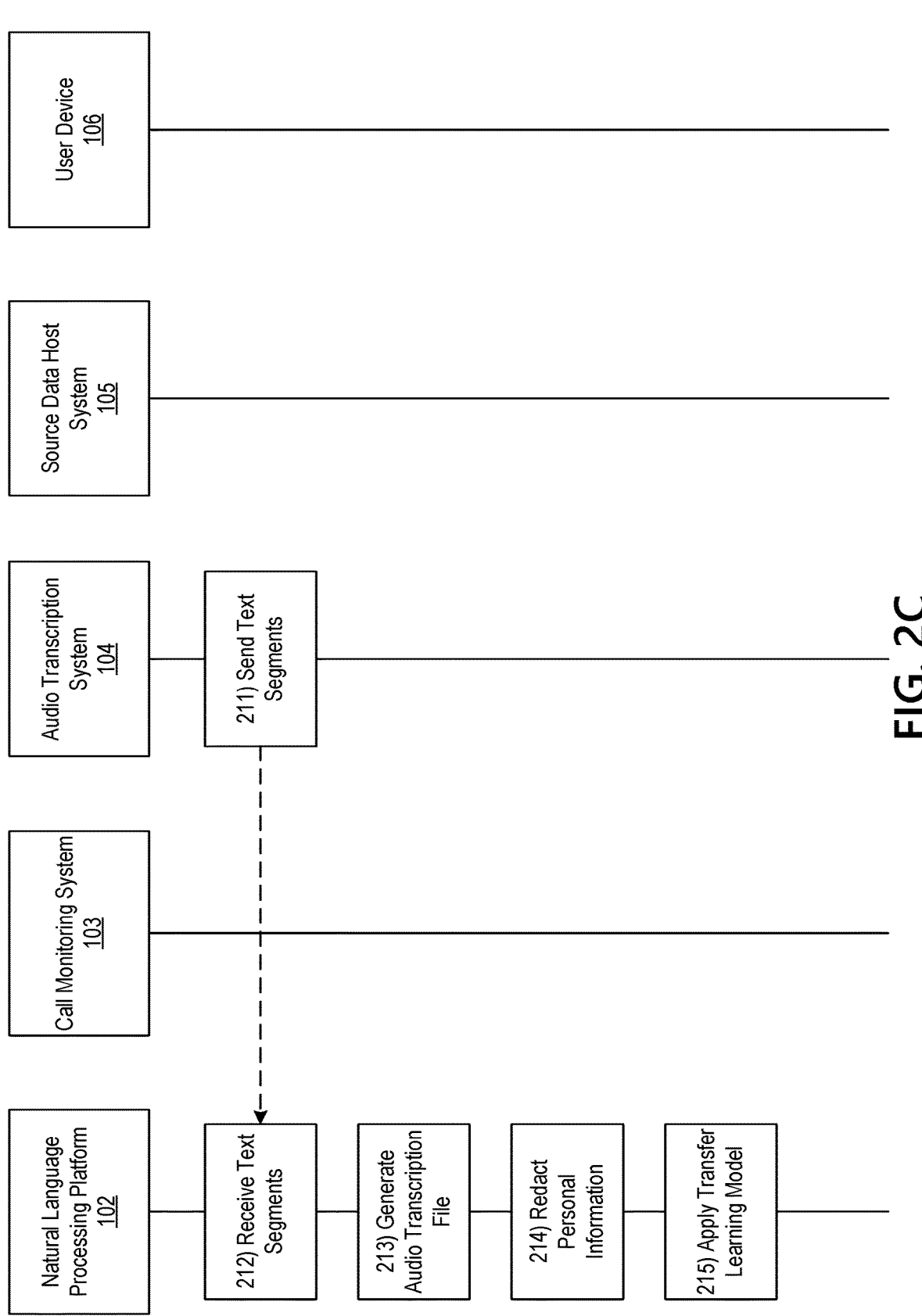

Referring to FIG. 2C, at step 211, the audio transcription system 104 may send, share, or otherwise provide the text segments to the natural language processing platform 102. In one or more instances, the audio transcription system 104 may send the text segments to the natural language processing platform 102 while the second wireless data connection is established. In some instances, the audio transcription system 104 may send the text segments in real time as they are determined. In other instances, the audio transcription system 104 may send the text segments in batches (e.g., based on a predetermined/configurable period of time or number of segments).

At step 212, the natural language processing platform 102 may receive, or otherwise access, the text segments sent at step 211. In receiving the text segments, the natural language processing platform 102 may receive the text segments via the communication interface and while the second wireless data connection is established.

At step 213, the natural language processing platform 102 may generate an audio transcription file based on the text segments received at step 212. For example, the natural language processing platform 102 may stitch together the text segments received at step 212 based on speaker identifiers and time stamps inserted into the text segments by the audio transcription system 104. In other instances, the natural language processing platform 102 may use other information to stitch together the text segments. In stitching the text segments together, the natural language processing platform 102 may generate a transcript corresponding to the entire audio file or a substantial portion of the entire audio file (e.g., without the silent portions). In one or more instances, in generating the audio transcription file, the natural language processing platform 102 may generate a transcript linked to the audio file. For example, a user (e.g., an adjuster or other employee of an insurance institution) may click on a portion of the audio transcription file, and the clicking may initiate playback of a portion of the audio file corresponding to the selected portion of the audio transcription file. In one or more instances, if the natural language processing platform 102 received video content at step 204 (rather than or in addition to merely an audio file), the natural language processing platform 102 may link the audio transcription file to the video content for selectable playback as described with regard to the audio file. Additionally or alternatively, the natural language processing platform 102 may receive a document, and may apply the remaining steps (as described with regard to the audio transcription file) to the document.

At step 214, the natural language processing platform 102 may redact personal information such as credit card information, bank account numbers, social security number, driver's license information, tax identifier, or the like. For example, in one or more instances, the natural language processing platform 102 may execute a Luhn algorithm ("Luhn algorithm" is a term of art and as used herein will be readily understood by those having ordinary skill in the art) to identify a number formatted like a credit card number, bank account number, or the like, and may then determine whether text indicative of the personal information (e.g., "credit card information," or the like) is determined to be within the rules used to confirm the presence of personal information. In some instances, the rules used to confirm the presence of personal information may be automatically determined by the natural language processing platform 102. In other instances, the rules used to confirm the presence of personal information may be configured by a user based on user input. As a result, in some instances, the natural language processing platform 102 may perform more complex processes at step 214. For example, a representative may say, "do you have his driver's license number" and the caller may respond with "no but his phone number is xxx-xxx-xxxx." In these instances, the natural language processing platform 102 may learn that the number described is a phone number as opposed to merely identifying it (incorrectly) as a driver's license number. To effectively redact the personal information, the natural language processing platform 102 may cover the information in the audio transcription file (e.g., using a black rectangle or the like) and/or may insert a tone into the audio file, to be overlaid on the personal information. Accordingly, this may increase the efficiency and reduce burden on harvesting the audio file because rather than pausing the recording each time personal information is mentioned (which may, e.g., lead to operational losses such as unrecorded information or lost data), the natural language processing platform 102 may simply redact the personal information from a complete audio recording of a call. Accordingly, this may also improve the quality/completeness of the call recording and/ or audio transcription file.

In one or more instances, the natural language processing platform 102 may determine that the audio transcription file does not contain personal information. In this instance, the natural language processing platform 102 may merely proceed to step 215.

At step 215, the natural language processing platform 102 may apply text standardization (e.g., text preprocessing) to the audio transcription file (which may, in some instances, be the redacted audio transcription file resulting from the redaction at step 214, and in other instances may be an unredacted audio transcription file). In performing the text standardization, the natural language processing platform 102 may apply various substitutions to the audio transcription file to standardize the audio transcription file format and/or to make it resemble other previously generated audio transcription files. For example, the natural language processing platform 102 may replace "ok" with "okay" throughout. In one or more instances, these preferred spellings/words may be stored in a database such as the natural language processing database 112*b*, and may be determined by the natural language processing platform 102 by performing an index lookup function based on the version of the word in the audio transcription file. Using similar techniques, the natural language processing platform 102 may identify spelling mistakes in the audio transcription file (e.g., based on common misspellings, or the like). In one or more instances, the text standardization described at step 215 may be performed prior to running the audio transcription file through any or all of the natural language processing models described herein. For example, this standardization may occur between steps 213 and 214 as illustrated herein. Furthermore, in some instances, the natural language processing platform 102 may apply the standardization described herein to train one or more models used to perform the methods described herein, but might not apply such standardization when performing the methods themselves once the models have been trained.

In one or more instances, the natural language processing platform 102 may perform tokenization to store a word as a number in a dictionary (e.g., 1023=cat). In doing so, the natural language processing platform 102 may make it easier to process the words. In these instances, the natural language processing platform 102 may create vectors for each word (e.g., using transfer learning) and modify them specifically for the domain (e.g., claim processing). Subsequently, at runtime and/or in production, the natural language processing platform 102 may then apply the vectors. Additionally or alternatively, rather than generating its own vectors the natural language processing platform 102 may download pre-existing vectors, such as Global Vectors (GloVe), bidirectional encoder representations from transforms (BERT) vectors, or the like.

Additionally or alternatively, the natural language processing platform 102 may apply a transfer learning model. For example, the natural language processing platform 102 may learn the meaning of particular words as applied to the specific domain at hand (e.g., claim processing, or the like), as opposed to a general domain. For example, the natural language processing platform 102 may learn that "claim number" may have a specific meaning in the claim process that, in some instances, may be different than text that merely includes both "claim" and "number" in a generic context. As another example, the natural language processing platform 102 may learn the meaning of specific phrases such as "you're in good hands," which may indicate a preamble during a claim recording, but may indicate something entirely different in the general domain. The meanings of these words and phrases may similarly be stored in a database such as the natural language processing database 112*b*.

As mistakes are made and/or new words and phrases are determined, the natural language processing platform 102 may dynamically update the natural language processing database 112*b* to refine machine learning datasets stored at the natural language processing database 112*b* and to reduce future errors in spelling, meaning, and context of the words included in the audio transcription file. In some instances, the natural language claim processing platform 102 might not perform the actions described at step 215.

Figure 2D:
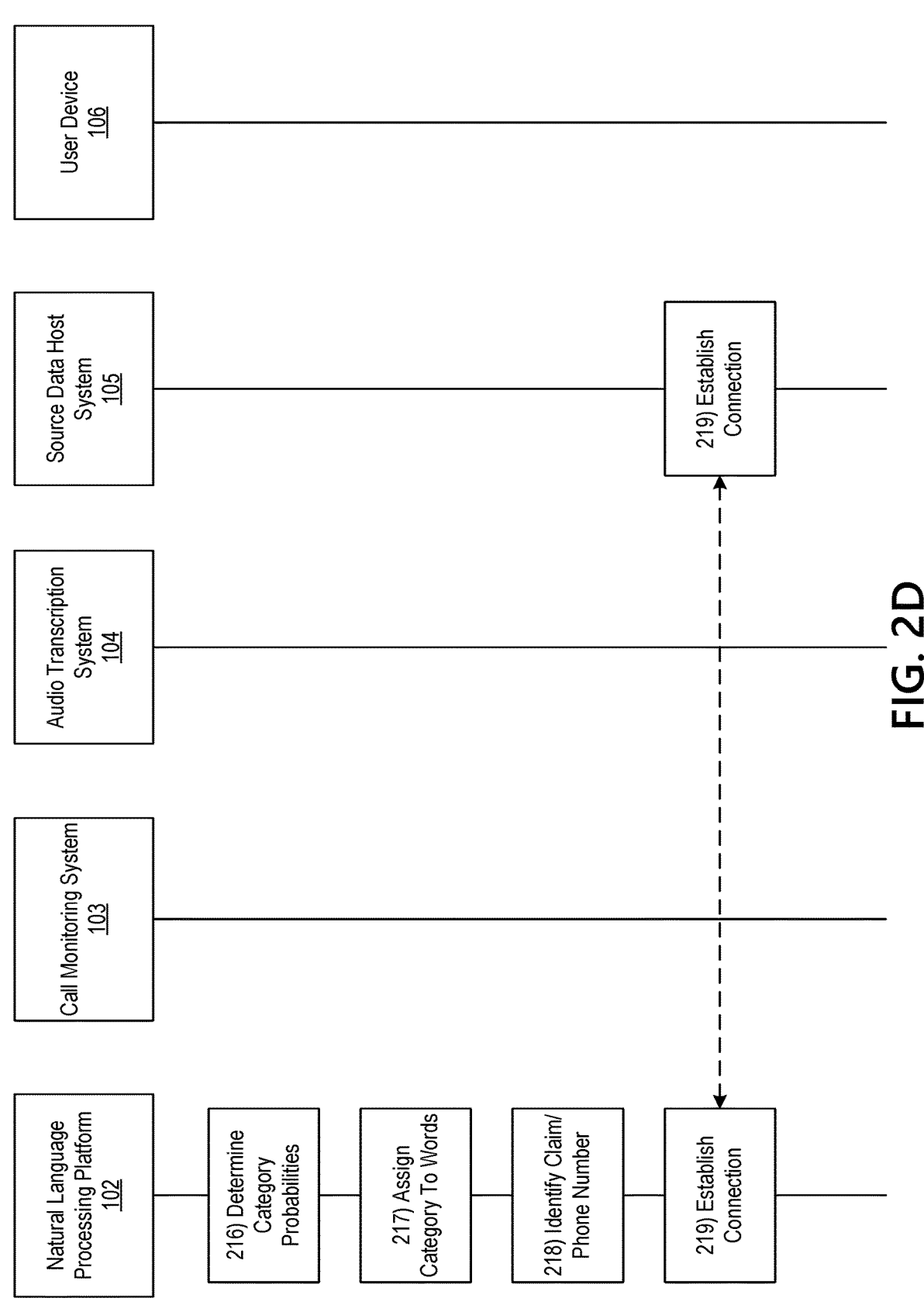

Referring to FIG. 2D, at step 216, the natural language processing platform 102 may determine a probability that each word corresponds to a particular category. For example, the natural language processing platform 102 may determine these probabilities based on the context determined through application of the transfer learning model at step 215. In one or more instances, in determining the probability that each word corresponds to a particular category, the natural language processing platform 102 may determine the probability that each word corresponds to a preamble, loss details, injury, damages, contact details, next steps, sign off, or the like (e.g., different parts of a claim discussion). For example, for each word, the natural language processing platform 102 may generate a vector including a probability that the word corresponds to each identified category.

At step 217, the natural language processing platform 102 may assign a category to each word. For example, based on the probabilities determined at step 216, the natural language processing platform 102 may determine a category that is most likely applicable to the word (e.g., the highest probability). In some instances, the natural language processing platform 102 may tag each word with the determined category, and may smooth transitions between various sections of the audio transcription file. For example, the audio transcription file may first include a preamble, and then contact details. In this example, the natural language processing platform 102 may generate section tags based on the word categories. In doing so, the natural language processing platform 102 may transform twenty words or so making up the preamble and the contact details into two defined sections. This may facilitate more efficient processing of the audio transcription file.

Additionally or alternatively, the natural language processing platform 102 may change categories assigned to particular words based on categories of adjacent words. For example, eight words may be tagged as "preamble," the next two may be "other," and the next ten may be "contact details." Based on the determination that the two "other" words are sandwiched between the preamble and the contact details, the natural language processing platform 102 may revise these two words to be associated with "preamble" or "contact details" rather than "other."

Additionally or alternatively, the natural language processing platform 102 may assign a priority level to each word or phrase based on the assigned categories. For example, the natural language processing platform 102 may assign a higher priority level to words tagged as "loss details" than those tagged as "other."

Additionally or alternatively, the natural language processing platform 102 may take a priority level for each of the categories into account when assigning the categories to each word or phrase. For example, the natural language processing platform 102 may determine that it is roughly the same probability that a word is either "other" or "loss details," and may assign the word to the "loss details" category because this category may have a higher priority than "other."

Based on the categorization, the natural language processing platform 102 may store a listing of each category, and which words/phrases correspond to the categories (e.g., "preamble-10," or the like). In some instances, to conserve computing resources, the natural language processing platform 102 might not store a word count for the category "other." By assigning a higher priority level to certain words, the natural language processing platform 102 may indicate that these words are more important in the claim analysis process than other words.

At step 218, the natural language processing platform 102 may identify information indicative of a user account and/or a claim in the audio transcription file. In one or more instances, the natural language processing platform 102 may determine that a number in the audio transcription file matches a typical claim or phone number pattern (e.g., the correct number of digits, pattern of digits or characters, or the like). In these instances, the natural language processing platform 102 may identify a string of numbers or characters, and extract a segment of pre-determined word/character count that includes the numbers (e.g., a 45 character window). After extracting the segment, the natural language processing platform 102 may analyze the segment to determine if the length of numbers included in the segment fits within a window of what could be a policy/claim/phone number. As an example, the segment may include "###, wait, let me get a pen, okay ###-####." In this example, the natural language processing platform 102 may identify that the segment contains a phone number, even though the number is split into a three digit and a seven digit string separated by some other words. Additionally or alternatively, the natural language processing platform 102 may remove noise and/or repetition to identify the policy/claim/phone number. For example, in one or more instances, the natural language processing platform 102 may analyze a user identifier or channel number associated with words to identify repetition (e.g., you give the employee your phone number and then he or she repeats it back to you). In some instances, the natural language processing platform 102 may continue to refine the segments identified until the correct number of digits is left (e.g., ten digits for a phone number, predetermined number of digits for a claim number, or the like). In these instances, the natural language processing platform 102 may also use logic to interpret numbers that may include varied numbers of leading zeros and/or pronunciations. For example, some individuals may say "oh" ("o") instead of "zero" ("0") when reading a number. As another example, if a number contains several leading zeros, some individuals may read those zeros, whereas others may simply go to the first non-zero integer. In one or more instances, the natural language processing platform 102 may use the information identified at step 218 natural language processing platform 102 to associate the audio transcription file to the claim.

Additionally or alternatively, the natural language processing platform 102 may cross-reference a database to classify a number as relating to an internal or external claim based on its format. Additionally or alternatively, the natural language processing platform 102 may use the identified number as a reference to find additional relevant details. In these instances, the natural language processing platform 102 may proceed to step 219 to establish a connection with source data host system 105, which may be an internal or external data source. If the natural language processing platform 102 does not plan to cross-reference an identified number, the natural language processing platform 102 may proceed to step 225.

At step 219, the natural language processing platform 102 may establish a connection with source data host system 105. In one or more instances, the natural language processing platform 102 may establish a third wireless data connection with source data host system 105 to link the natural language processing platform 102 to the source data host system 105. In one or more instances, the natural language processing platform 102 may determine whether the natural language processing platform 102 previously established a connection with the source data host system 105. If the natural language processing platform 102 did previously establish a connection with the source data host system 105, the natural language processing platform 102 might not attempt to re-establish the third wireless data connection. However, if the natural language processing platform 102 did not previously establish a connection with the source data host system 105, the natural language processing platform 102 may establish the third wireless data connection as described herein.

Figure 2E:
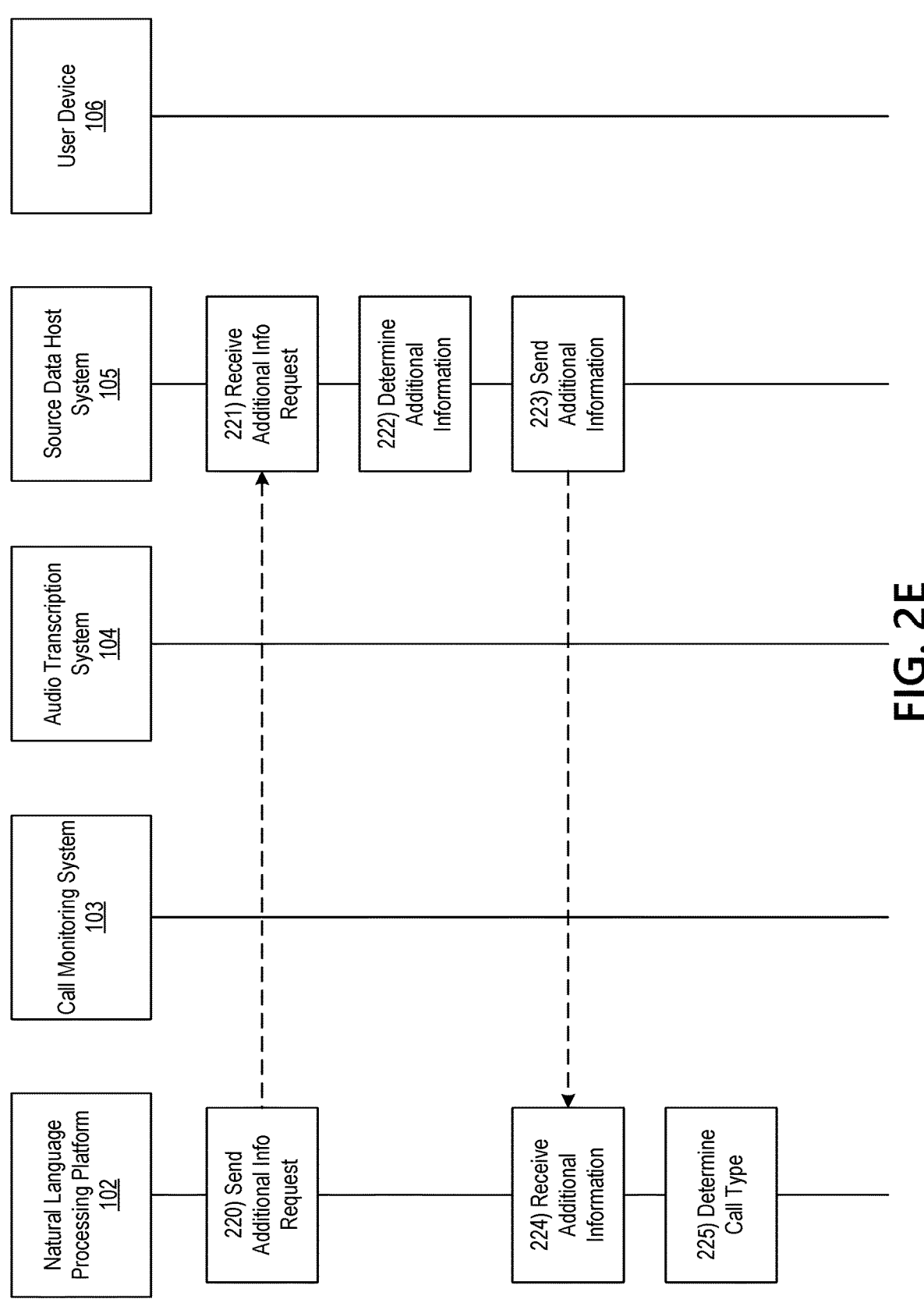

Referring to FIG. 2E, at step 220, the natural language processing platform 102 may send, share, or otherwise provide a request for additional information associated with the number identified at step 218. In one or more instances, the natural language processing platform 102 may send the request for additional information associated with the number identified at step 218 via the communication interface 113 and while the third wireless data connection is established. In one or more instances, along with the request, the natural language processing platform 102 may send the number identified at step 218 and one or more commands directing the source data host system 105 to determine additional source data corresponding to the number.

At step 221, the source data host system 105 may receive or otherwise access the request for additional information associated with the number identified at step 218. In one or more instances, the source data host system 105 may receive the request for additional information associated with the number identified at step 218 while the third wireless data connection is established. In one or more instances, along with the request, the source data host system 105 may receive the number identified at step 218 and one or more commands directing the source data host system 105 to determine additional source data corresponding to the number.

At step 222, the source data host system 105 may determine additional information associated with the number received at step 221. For example, the source data host system 105 may determine additional details associated with an individual and/or a claim. In some instances, the source data host system 105 may distinguish existing customers from others based on a format of a provided claim number. In these instances, the source data host system 105 may determine different data for existing customers (e.g., data associated with the existing claim) than for others (e.g., because they might not yet have filed a claim).

At step 223, the source data host system 105 may send, share, or otherwise provide the additional information determined at step 222 to the natural language processing platform 102. In one or more instances, the source data host system 105 may send the additional information to the natural language processing platform 102 while the third wireless data connection is established.

At step 224, the natural language processing platform 102 may receive the additional information sent at step 224. In one or more instances, the natural language processing platform 102 may receive the additional information via the communication interface 113 and while the third wireless data connection is established.

In one or more instances, steps 218-224 may be performed simultaneously with steps 215-217. In other instances, steps 218-224 may be performed before or after steps 215-217.

At step 225, the natural language processing platform 102 may determine a call type corresponding to the audio transcription file. For example, it may be advantageous for the natural language processing platform 102 to distinguish a first notice of loss recording in which an individual wishes to start a claim from a recording regarding an existing claim by determining the context of the discussion or other characteristics of the call as a whole captured by the audio transcription file. For example, a first notice of loss call may tend to be longer in duration than a follow up call. Additionally or alternatively, the natural language processing platform 102 may identify an existing claim number in the audio transcription file as described above with regard to step 218, and may determine based on the existing claim number that the recording is a follow up regarding an existing claim. In some instances, the natural language processing platform 102 may implement a deep learning model (e.g., a tested deep learning model), a classical statistical learning model (e.g., support vector machine), or the like to perform the methods of step 225. In one or more instances, step 225 may be performed simultaneously with steps 215-217. In other instances, step 225 may be performed before or after steps 215-217.

Figure 2F:
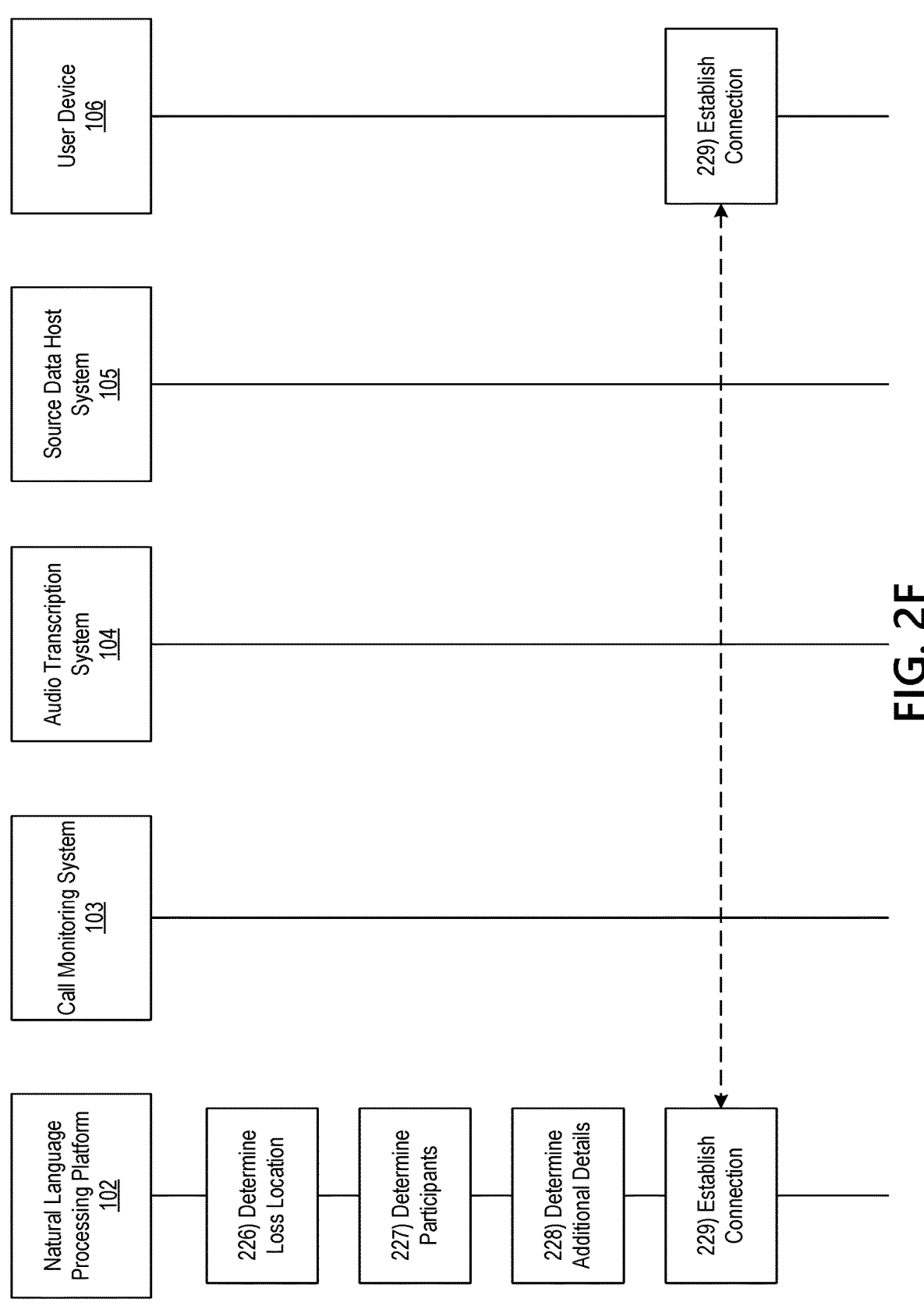

Referring to FIG. 2F, at step 226, the natural language processing platform 102 may determine a loss location based on the audio transcription file. In doing so, the natural language processing platform 102 may look at text segments within the audio transcription file of a predefined length, which may be automatically determined and/or based on a user input. The natural language processing platform 102 may analyze one or more words categorized as "loss details" at step 217 by analyzing part-of-speech (POS) tags associated with each word in the audio transcription file. In analyzing the loss details, the natural language processing platform 102 may capitalize words that appear to be relevant to a particular address, intersection, or the like, based e.g., on one or more machine learning datasets and using one or more machine learning algorithms. Additionally or alternatively, once these words are capitalized, the natural language processing platform 102 may feed the loss details into a loss location determination model, which may determine, based at least in part on the capitalization, the loss location. Additionally or alternatively, the natural language processing platform 102 may access data (e.g., global positioning data, or the like) corresponding to a phone, mobile device, telematics data sources, or the like that initiated the voice call session. In these instances, the natural language processing platform 102 may access latitude and longitude data that specifies an exact location of the loss.

In one or more instances, the natural language processing platform 102 may access additional data corresponding to the loss location. For example, the natural language processing platform 102 may access data from one or more telematics sensors or cameras, which may be stored at a database such as the source data host system 105. In this example, the natural language processing platform 102 may be able to confirm details of the call verifying against the data from the one or more telematics sensors or cameras.

At step 227, the natural language processing platform 102 may determine one or more additional participants in an accident or other event described in the audio transcription file. As an example, the audio transcription file may indicate, "my mom was on the porch." In one or more instances, the natural language processing platform 102 may use similar word tagging and isolation techniques as described above to determine names, phone numbers, emails, addresses, ages, or the like that are described in the audio transcription file. In these instances, the natural language processing platform 102 may determine a role for each additional participant (e.g., witness, passenger, injured party, or the like). In some instances, the natural language processing platform 102 may determine credibility of one of these additional participants by verifying their speech against other data, such as the telematics data described above at step 226.

In some instances, as an initial step, rather than identifying all individuals specified in the audio transcription file, the natural language processing platform 102 may simply flag that there are witnesses. Once this question has been addressed, the natural language processing platform 102 may determine additional details regarding the witnesses/participants as described above. In these instances, the natural language processing platform 102 may include these additional details in a secondary field. In some instances, the natural language processing platform 102 may route a claim corresponding to the audio transcription file to a particular group or individual based on a severity of an injury described. In these instances, the natural language processing platform 102 may use recording duration as a factor in determining the severity of the injury (e.g., longer recording means more severe, or the like). By automating these determinations, the natural language processing platform 102 may increase the efficiency of claim processing by minimizing further discussions and reducing the amount of decisions and level of interpretation expected of a user (e.g., a claim adjuster).

At step 228, the natural language processing platform 102 may determine additional details based on the audio transcription file and/or additional received data (e.g., telematics data, customer/claim database information, or the like). For example, the natural language processing platform 102 may compare telematics data with the words of the audio transcription file to validate information given by one or more speakers. Additionally or alternatively, the natural language processing platform 102 may determine a point of image, damage, total loss determinations, driver actions, traffic signs, road conditions, traffic control designs, traffic patterns, times, or the like.

At step 229, the natural language processing platform 102 may establish a connection with the user device 106. For example, the natural language processing platform 102 may establish a fourth wireless data connection to link the natural language processing platform 102 to the user device 106. In some instances, the natural language processing platform 102 may determine whether a connection was previously established with the user device 106. If a connection was previously established, the natural language processing platform 102 might not re-establish the fourth wireless data connection. If a connection was not previously established, the natural language processing platform 102 may establish the fourth wireless data connection.

Figure 2G:
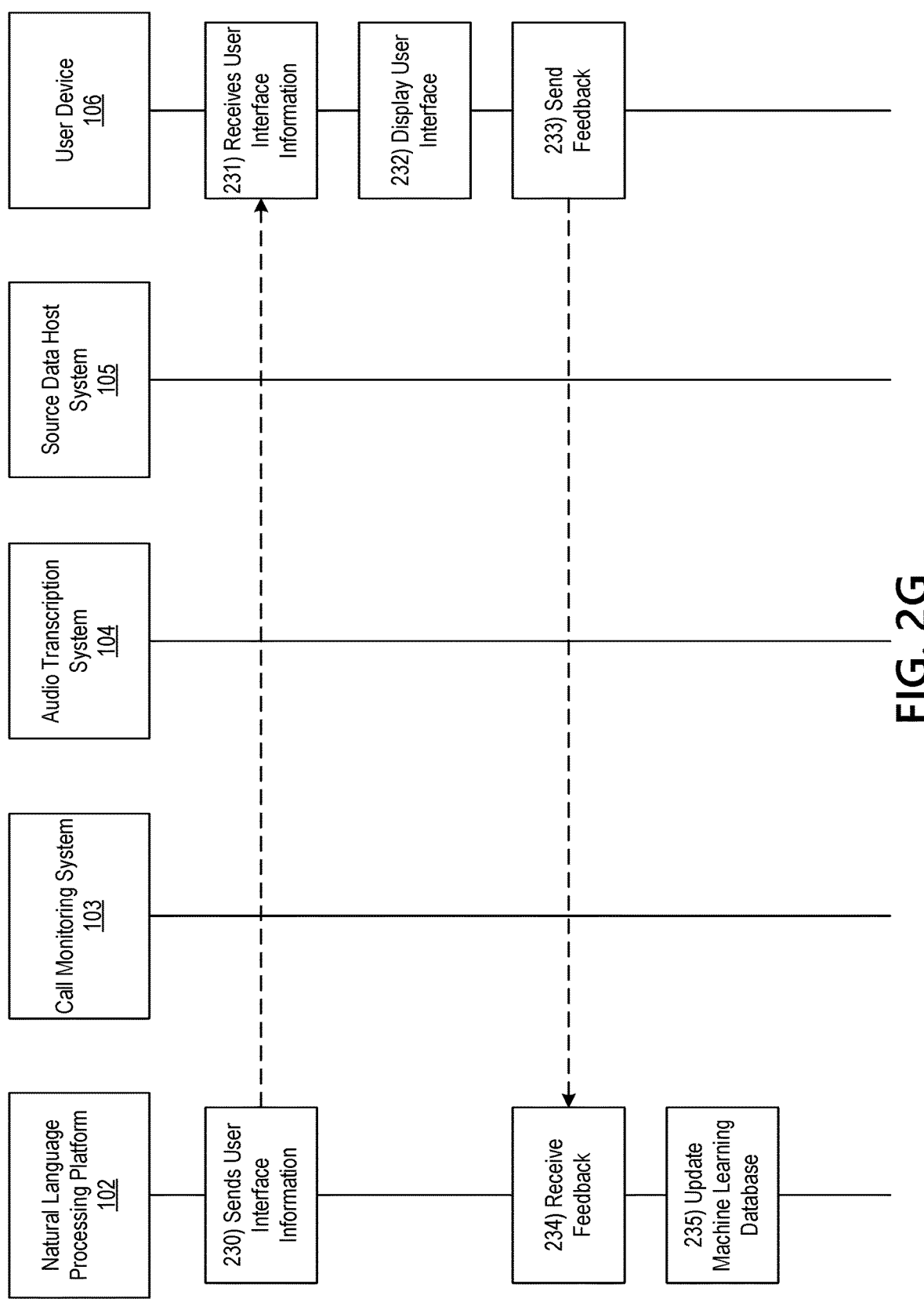

Referring to FIG. 2G, at step 230, the natural language processing platform 102 may generate and send user interface information and one or more commands directing the user device 106 to display a user interface based on the user interface information. In one or more instances, the natural language processing platform 102 may generate the user interface information based on the categorized words determined at step 217, the additional information received at step 224, the call type determined at step 225, the loss location determined at step 226, the participants determined at step 227, and/or the additional details determined at step 228. In one or more instances, the natural language processing platform 102 may send the user interface information via the communication interface 113 and while the fourth wireless data connection is established.

At step 231, the user device 106 may receive the user interface information and the one or more commands directing the user device 106 to display a user interface based on the user interface information. In one or more instances, the user device 106 may receive the user interface information while the fourth wireless data connection is established.

Figure 4:
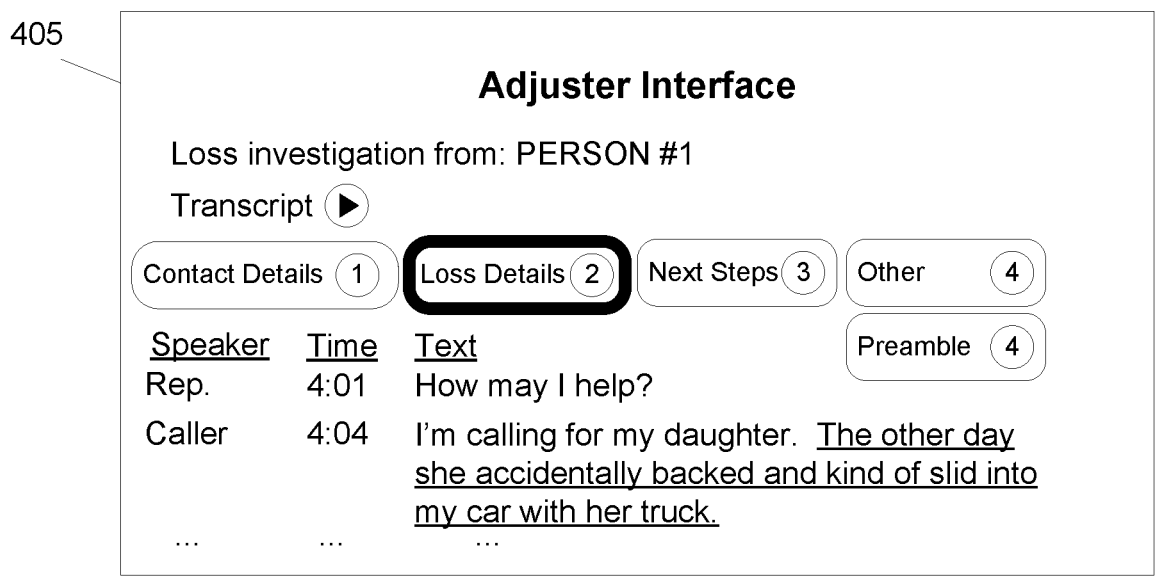
FIGS. 4-7 depict illustrative user interfaces for automating claim analysis using improved natural language processing techniques in accordance with one or more example arrangements discussed herein.

At step 232, the user device 106 may display a user interface based on the user interface information received at step 231. In one or more instances, in displaying the user interface, the user device 106 may prompt for user input regarding processing of the claim. In other instances, if enough information has been automatically determined by the natural language processing platform 102, the user device 106 may automatically process the claim. In one or more instances, in displaying the user interface, the user device 106 may display a graphical user interface similar to graphical user interface 405, which is shown in FIG. 4. For example, graphical user interface 405 (an interface that may be presented to a claim adjuster, for example) illustrates an interface based on the categorized words from step 217. For example, graphical user interface 405 may indicate that one section of contact details was identified, two sections of loss details were identified, three sections of next steps were identified, four other sections were identified, and four preamble sections were identified. As shown in FIG. 4, a user may select a particular category such as loss details, and the text from the audio transcription file corresponding to the loss details may be automatically displayed to the user and distinguished from the rest of the audio transcription file. For example, in graphical user interface 405, "the other day she accidentally backed up and kind of slid into my car with her truck" is emphasized because it is a loss detail. In contrast, "I'm calling for my daughter" is not emphasized because this may be tagged as, for example, a contact detail or participants. Similarly, "how may I help" is not emphasized because this may be tagged as, for example, a preamble. Similarly, a user may select text displayed on the screen, and may select the play button to play audio corresponding to the selected portion of the text. In one or more instances, the categories displayed may be dynamically added, removed, updated, changed, or the like based on machine learning, artificial intelligence, business needs, user feedback, or the like. It should be understood that the categories displayed via the user interface may be any number of various categories that may be different than those explicitly presented in graphical user interface 405.

Figure 5:
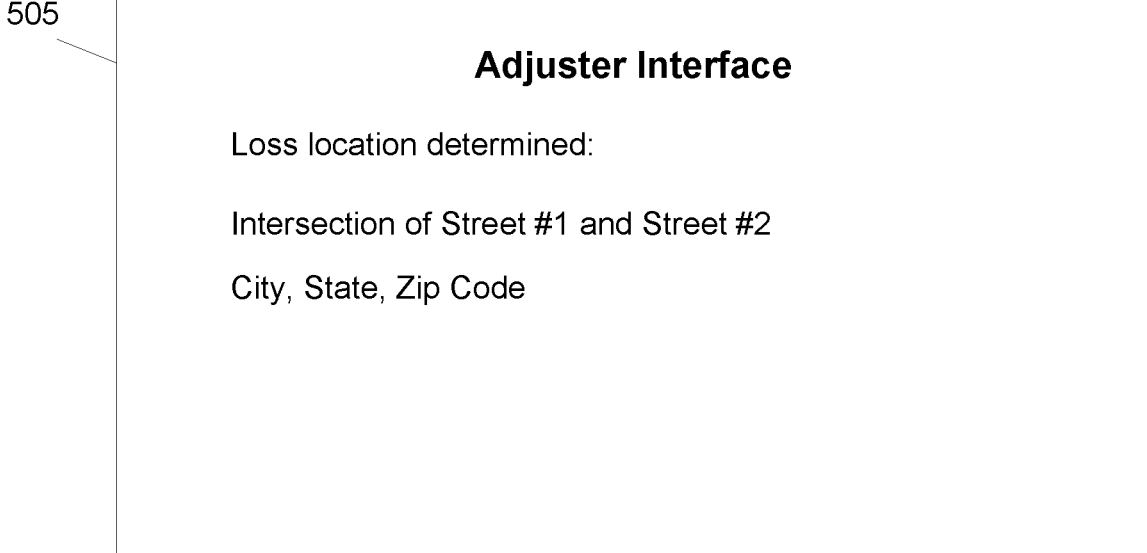

In another instance, in displaying the user interface, the user device 106 may display a graphical user interface similar to graphical user interface 505, which is shown in FIG. 5. For example, the user interface may display a loss location determined automatically from the audio transcription file text as described at step 226.

Figure 6:
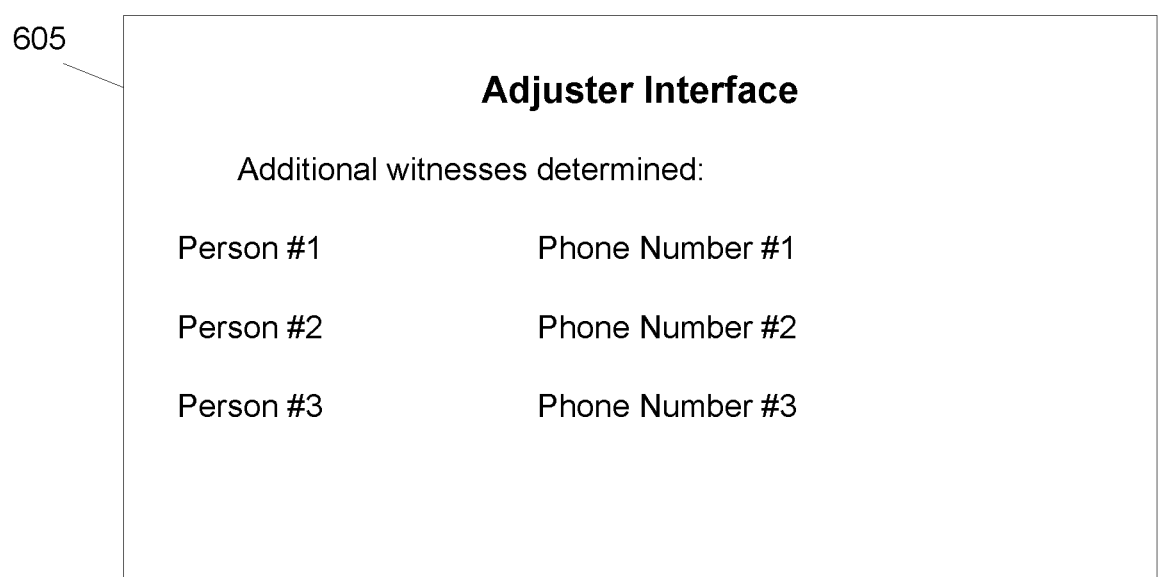

In yet another instance, in displaying the user interface, the user device 106 may determine a graphical user interface similar to graphical user interface 605, which is shown in FIG. 6. For example, the user interface may display additional witnesses determined from the audio transcription file, and may include contact information for each additional witness, as described above with regard to step 227.

Figure 7:
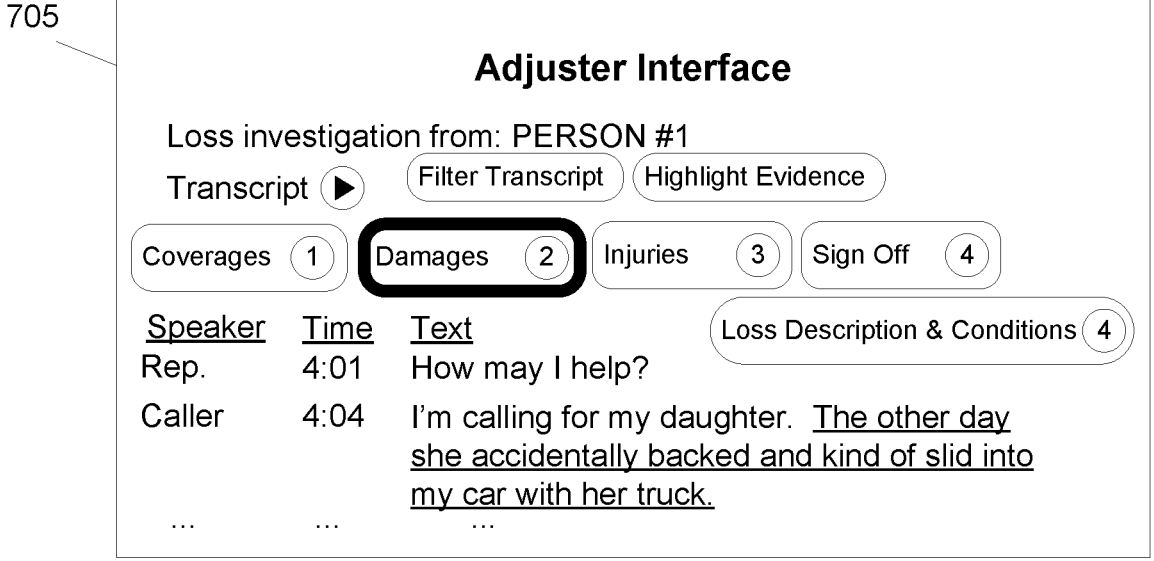

In yet another instance, in displaying the user interface, the user device 106 may determine a graphical user interface similar to graphical user interface 705, which is shown in FIG. 7. For example, the user interface may display a portion of the audio transcript file (similar to what is illustrated in FIG. 4), but may display a different set of categories, which may be dynamically determined, added, removed, changed, or the like based on machine learning analysis, artificial intelligence, business needs, or the like. For example, the user interface may display categories such as coverages, damages, injuries, sign off, loss description & conditions, and the like. Additionally, the user interface may display options to highlight evidence and/or to filter the transcript, which may tag and extract from the audio transcript file information useful to determining fault and/or presenting a defense to liability using the methods described herein.

It should be understood that a user of the user device 106 may be able to toggle between a plurality of user interfaces to facilitate claim processing based on a claim call transcription.

With further reference to FIG. 2G, at step 233, the user device 106 may receive and send, share, or otherwise provide feedback (which may e.g., be based on an adjuster's experience in processing a particular claim) to the natural language processing platform 102. For example, in receiving the feedback, the user device 106 may receive a user input indicating that a portion of the audio transcription file text was categorized into an improper category. For example, preamble text may have been erroneously tagged as loss details. As another example, a participant may be identified along with an incorrect phone number or other contact details. In these examples, the user device 106 may send feedback to the natural language processing platform 102 to facilitate improvement of models and datasets used by the natural language processing platform 102 in the natural language claim processing. In one or more instances, the user device 106 may send the feedback while the fourth wireless data connection is established.

At step 234, the natural language processing platform 102 may receive or otherwise access the feedback sent at step 233. In one or more instances, the natural language processing platform 102 may receive the feedback via the communication interface 113 and while the fourth wireless data connection is established.

At step 235, the natural language processing platform 102 may update one or more machine learning datasets stored in, for example, the natural language processing database 112*b* and/or the machine learning engine 112*c* that are used to perform natural language processing of the audio transcription file. In doing so, the natural language processing platform 102 may iteratively refine its ability to perform the claim processing and analysis techniques as described herein and to increase the accuracy and efficiency of claim processing.

Subsequently the event sequence may end. Accordingly, the systems and methods described herein may be used to address technical difficulties associated with claim processing. By incorporating natural language processing, claim processing may be increasingly automated, thus increasing the efficiency of claim analysis and increasing the accuracy of the analysis results. Furthermore, by incorporating such automation, processing costs (both computational and financial) may be reduced, and computing power may be conserved through the transcript manipulation techniques described herein.

It should be understood that the steps described in the illustrative event sequence may be performed in any order without departing from the scope of the disclosure.

Figure 3:
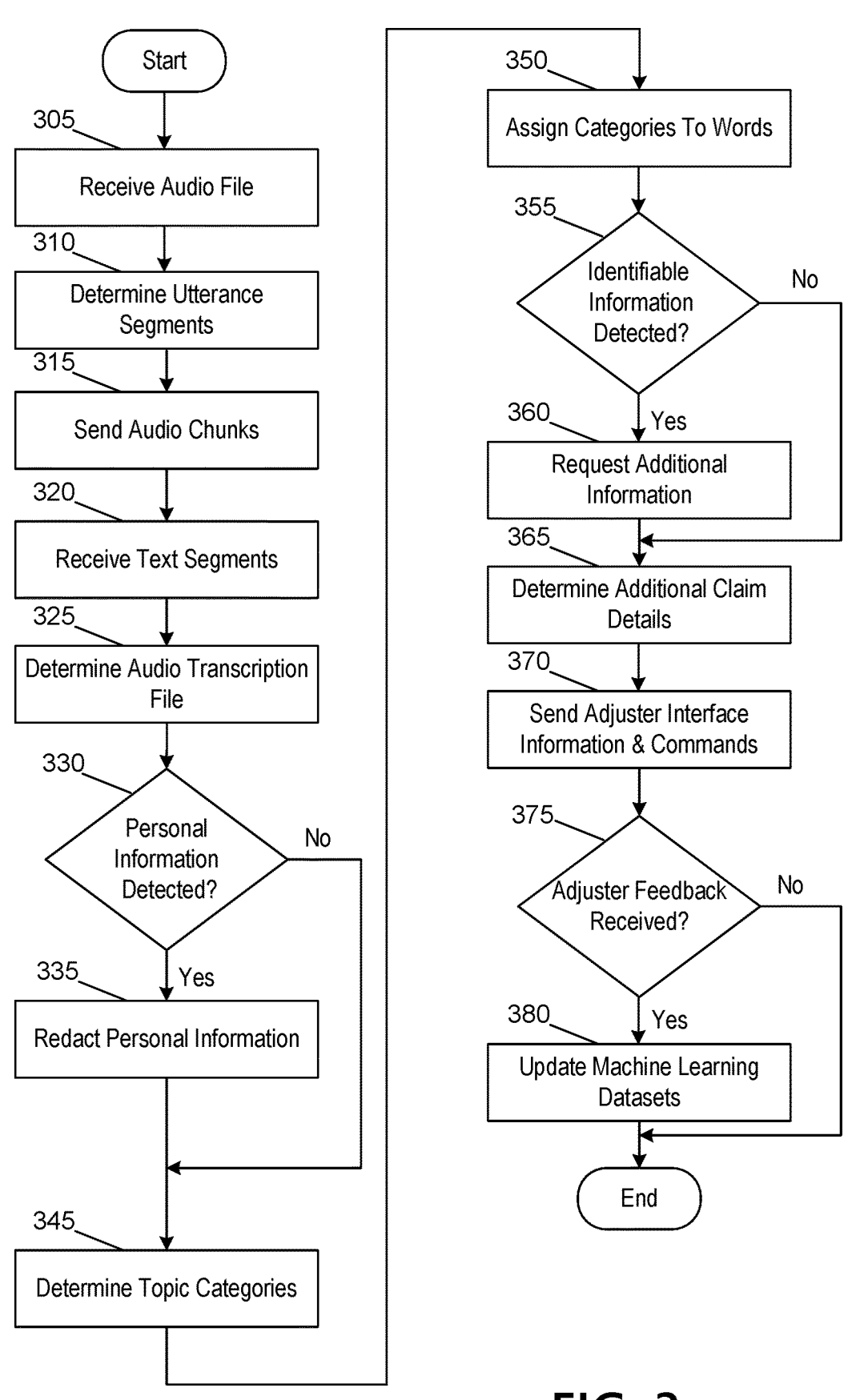
FIG. 3 depicts an illustrative method for automating claim analysis using improved natural language processing techniques in accordance with one or more example arrangements discussed herein.

FIG. 3 depicts an illustrative method for automating claim analysis using improved natural language processing techniques in accordance with one or more example embodiments. Referring to FIG. 3, at step 305, the computing platform may receive an audio file. At step 310, the computing platform may determine utterance segments within the audio file. At step 315, the computing platform may send audio chunks to an audio transcription system 104 based on the utterance segments. At step 320, the computing platform may receive text segments from the audio transcription system. At step 325, the computing platform may determine an audio transcription file based on the text segments. At step 330, the computing platform may determine whether the audio transcription file contains personal information. If not, the computing platform may proceed to step 340. If so, the computing platform may proceed to step 335.

At step 335, the computing platform may redact personal information from the audio transcription file. At step 345, the computing platform may determine probabilities that each word in the audio transcription file corresponds to a particular category. At step 350, the computing platform may assign categories to each word based on the probabilities. At step 355, the computing platform may determine whether a claim or phone number was detected. If not, the computing platform may proceed to step 365. If so, the computing platform may proceed to step 360.

At step 360, the computing platform may request additional information associated with the claim or phone number determined and may receive the information in response. At step 365, the computing platform may determine additional claim details based on information determined from the audio transcription file. At step 370, the computing platform may generate and send user interface information and one or more commands directing the user device 106 to display an interface based on the user interface information. At step 375, the computing platform may determine whether feedback was received. If no feedback was received, the method may end. If feedback was received, the computing platform may proceed to step 380. At step 380, the computing platform may update one or more machine learning datasets based on the feedback.

Figure 8A:
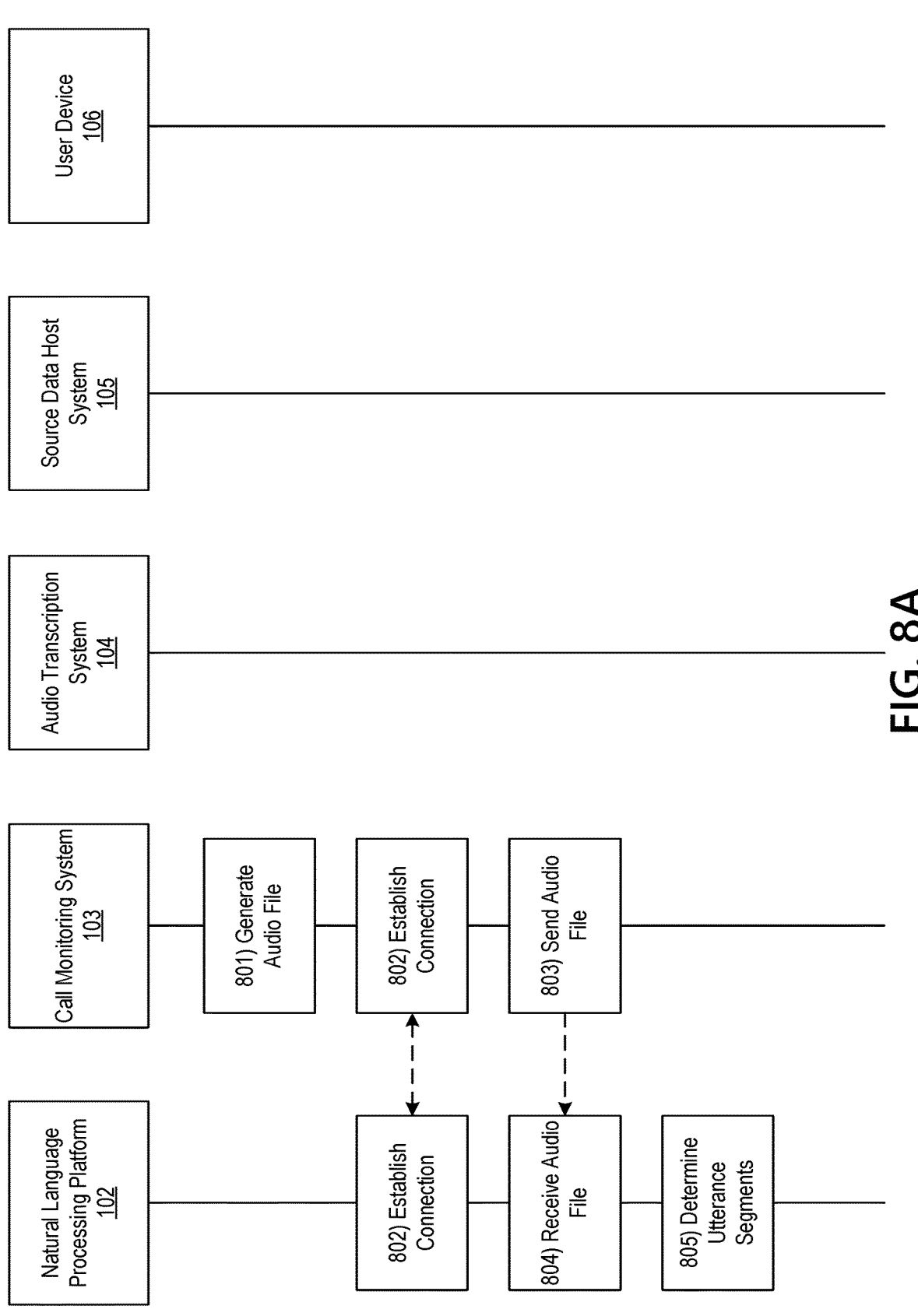
FIGS. 8A-8G depict an illustrative event sequence for performing claim transcription and translation using improved natural language processing techniques in accordance with one or more example arrangements discussed herein.

FIGS. 8A-8G depict an illustrative event sequence for performing claim transcription and translation using improved natural language processing techniques in accordance with one or more example embodiments. It should be understood that the illustrative event sequence shown in FIGS. 8A-8G may be performed, in full or in part, in addition to, in combination with, and/or independently from the illustrative event sequence shown in FIGS. 2A-2G (either certain portions or in its entirety). Referring to FIG. 8A, at step 801, the call monitoring system 103 may generate an audio file. For example, in generating the audio file, the call monitoring system 103 may, with any necessary permissions, record a conversation (e.g., between a customer and an agent, or the like) over one of a plurality of mediums (e.g., telephone, voice over internet protocol, video conference, or the like). It should be understood that in generating the audio file, in some instances, the call monitoring system 103 may generate an audio file along with a video file (e.g., the call monitoring system 103 may record a video conference, or the like).

In some instances, in generating the audio file, the call monitoring system 103 may record a conversation that contains multiple languages. For example, a first individual (e.g., a representative, agent, claim adjuster, or the like) may receive a call from a second individual (e.g., a customer or the like) and may initially speak to the second individual in a first language (e.g., English). In some instances however, the second individual may speak the first language with a severe accent, be a non-native speaker, or not even speak the first language at all. Accordingly, in these instances, the second individual may respond to the first individual using a second language (e.g., Spanish, Mandarin, or the like). In these instances, a third individual may participate in the conversation to facilitate interaction between the first individual and the second individual. For example, the first individual may call a language line associated with the second language, and may request a translator to interface between the first individual and the second individual. In this example, the audio file may contain utterances from the first individual and the third individual in the first language and utterances from the second individual and the third individual in the second language.

In some instances, in generating the audio file, the call monitoring system 103 may record a conversation that contains a single foreign language. For example, a first individual may be a representative, agent, claim adjuster, or the like as described above who is located in a local community office where the foreign language is predominantly spoken. In these instances, when the first individual receives a call from a second individual (e.g., a customer, or the like), he or she may initially speak using the foreign language rather than a native language (e.g., based on the community customs). In some instances, the first individual may answer the call using the native language, but then after receiving a reply from the second individual in the foreign language, may switch to conversing using the foreign language.

In some instances, the second individual might not speak the native language, and thus may include a third individual (e.g., a child, friend, relative, or the like) who can speak the native language on the phone with the first individual. Accordingly, these instances may result in an audio file similar to that described above with regard to the use of a translator (e.g., with the third individual acting as a translator), and may contain a mix of conversation in the native and foreign languages. In some instances, the call monitoring system 103 may generate an audio file as described above with regard to step 201.

At step 802, the call monitoring system 103 may establish a connection with the natural language processing platform 102. In one or more instances, in establishing the connection with natural language processing platform 102, the call monitoring system 103 may perform actions similar to those described above at step 202 in establishing the first wireless data connection.

At step 803, the call monitoring system 103 may send, share, or otherwise provide the audio file, generated at step 801, to the natural language processing platform 102. In sending the audio file, the call monitoring system 103 may perform actions similar to those described above at step 203. However, at step 803, the call monitoring system 103 may send an audio file containing speech from one or more languages (e.g., a native language and/or a foreign language).

At step 804, the natural language processing platform 102 may receive or otherwise access the audio file sent at step 803. In one or more instances, in receiving the audio file, the natural language processing platform 102 may perform actions similar to those described above at step 204. However, at step 804, the natural language processing platform 102 may receive an audio file containing speech from one or more languages (e.g., a native language (e.g., from a claim adjuster, representative, agent or the like) and/or a foreign language (e.g., from a customer, translator, other third party, or the like)).

At step 805, the natural language processing platform 102 may determine one or more utterance segments in the audio file. In one or more instances, in determining the one or more utterance segments in the audio file, the natural language processing platform 102 may perform actions similar to those described above with regard to step 205. However, at step 805, some of the utterance segments may contain speech from one or more languages (e.g., a native language (e.g., from a claim adjuster, representative, agent or the like) and/or a foreign language (e.g., from a customer, translator, other third party, or the like)).

Figure 8B:
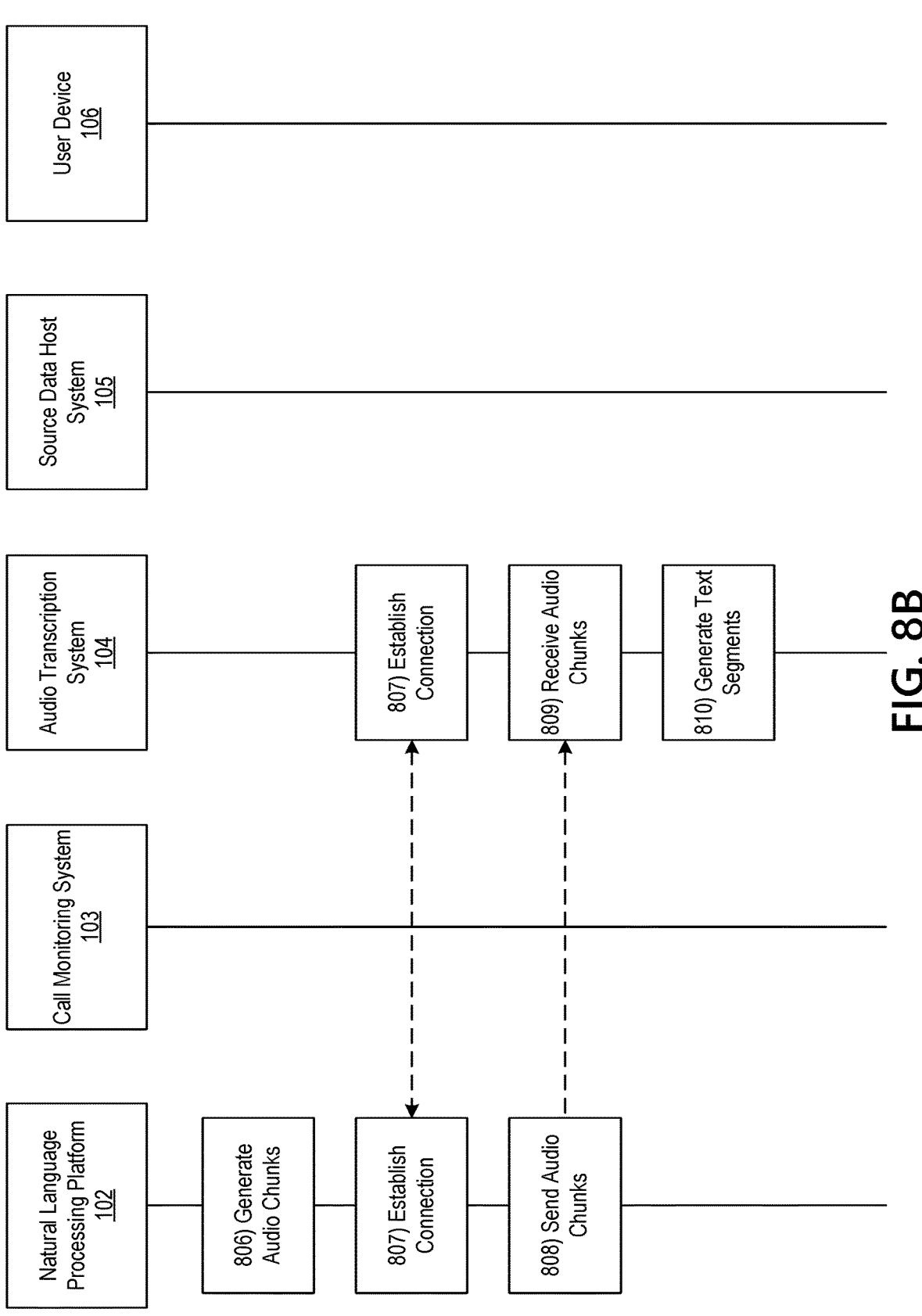

Referring to FIG. 8B, at step 806, the natural language processing platform 102 may generate one or more audio chunks, each corresponding to one of the utterance segments determined at step 805. In one or more instances, in generating the one or more audio chunks, the natural language processing platform 102 may perform actions similar to those described above with regard to step 206. However, at step 806, some of the audio chunks may contain speech from one or more languages (e.g., a native language (e.g., from a claim adjuster, representative, agent or the like) and/or a foreign language (e.g., from a customer, translator, other third party, or the like)).

In some instances, in generating the one or more audio chunks, the natural language processing platform 102 may perform diarization ("diarization" is a term of art and as used herein will be readily understood by those having ordinary skill in the art) to distinguish various speakers in the audio file and/or to distinguish speech from background noise. By performing diarization prior to sending the one or more audio chunks for processing by the audio transcription system 104, the natural language processing platform 102 may avoid common issues resulting from the performance of such diarization by another computing device and/or vendor. For example, because the audio file is being split into one or more audio chunks by natural language processing platform 102 before being sent to audio transcription system 104, the vendor (e.g., an organization controlling and/or maintaining audio transcription system 104) may perform diarization on a chunk by chunk basis, and thus may assign different numeric values for the same speaker across the one or more audio chunks. Accordingly, because the numbering is inconsistent for each speaker, the vendor may be unable to correctly classify a speaker's entire role in the audio file for purposes of generating a line by line transcript indicating a speaker for each line throughout a conversation.

At step 807, the natural language processing platform 102 may establish a connection with the audio transcription system 104. In some instances, in establishing the connection with the audio transcription system 104, the natural language processing platform 102 may perform actions similar to those described above at step 207 with regard to the second wireless data connection.

At step 808, the natural language processing platform 102 may send, share, or otherwise provide the audio chunks, generated at step 807, to the audio transcription system 104. In sending the audio chunks, the natural language processing platform 102 may perform actions similar to those described above with regard to step 208. However, at step 808, the natural language processing platform 102 may send audio chunks containing speech in a foreign language to the audio transcription system 104. In one or more instances, prior to sending the audio chunks, the natural language processing platform 102 may identify one or more languages spoken in the audio chunks. As a first example, the natural language processing platform 102 may determine whether a name of a language is explicitly stated. For example, the natural language processing platform 102 may determine that an interpreter or other call participant explicitly states a language that he or she is about to translate into (e.g., "this is Person #1, interviewing Person #2, through a Spanish language interpreter, Person #3."). In this example, the natural language processing platform 102 may determine, prior to transcription of the audio chunks, that the audio chunks contain both English and Spanish content. As another example, the natural language processing platform 102 may determine one or more languages spoken in the audio chunks based on acoustic properties of the audio chunks. For example, the natural language processing platform 102 may process the audio chunks using an audio processing model to determine one or more predicted languages. This may similarly allow the natural language processing platform 102 to determine the one or more languages prior to transcription of the audio recording (e.g., by analyzing a distribution of phonemes and/or other characteristics of the voice/acoustics in the call).

At step 809, the audio transcription system 104 may receive or otherwise access the audio chunks sent at step 808. In receiving the audio chunks, the audio transcription system may perform actions similar to those described above with regard to step 209. However, at step 809, the audio transcription system 104 may receive audio chunks containing speech in one or more languages (e.g., a native language (e.g., from a claim adjuster, representative, agent or the like) and/or a foreign language (e.g., from a customer, translator, other third party, or the like)).

At step 810, the audio transcription system 104 may generate text segments each corresponding to a single audio chunk received at step 809. In one or more instances, in generating the text segments, the audio transcription system 104 may apply a language transcription model associated with a native language (e.g., English). In generating the text segments, the audio transcription system 104 may perform actions similar to those described above with regard to step 210. It should be noted, however, that because some of the audio chunks received at step 809 may have been in a foreign language, the audio transcription system 104 may be applying a native language transcription model to audio chunks of a foreign language.

Figure 8C:
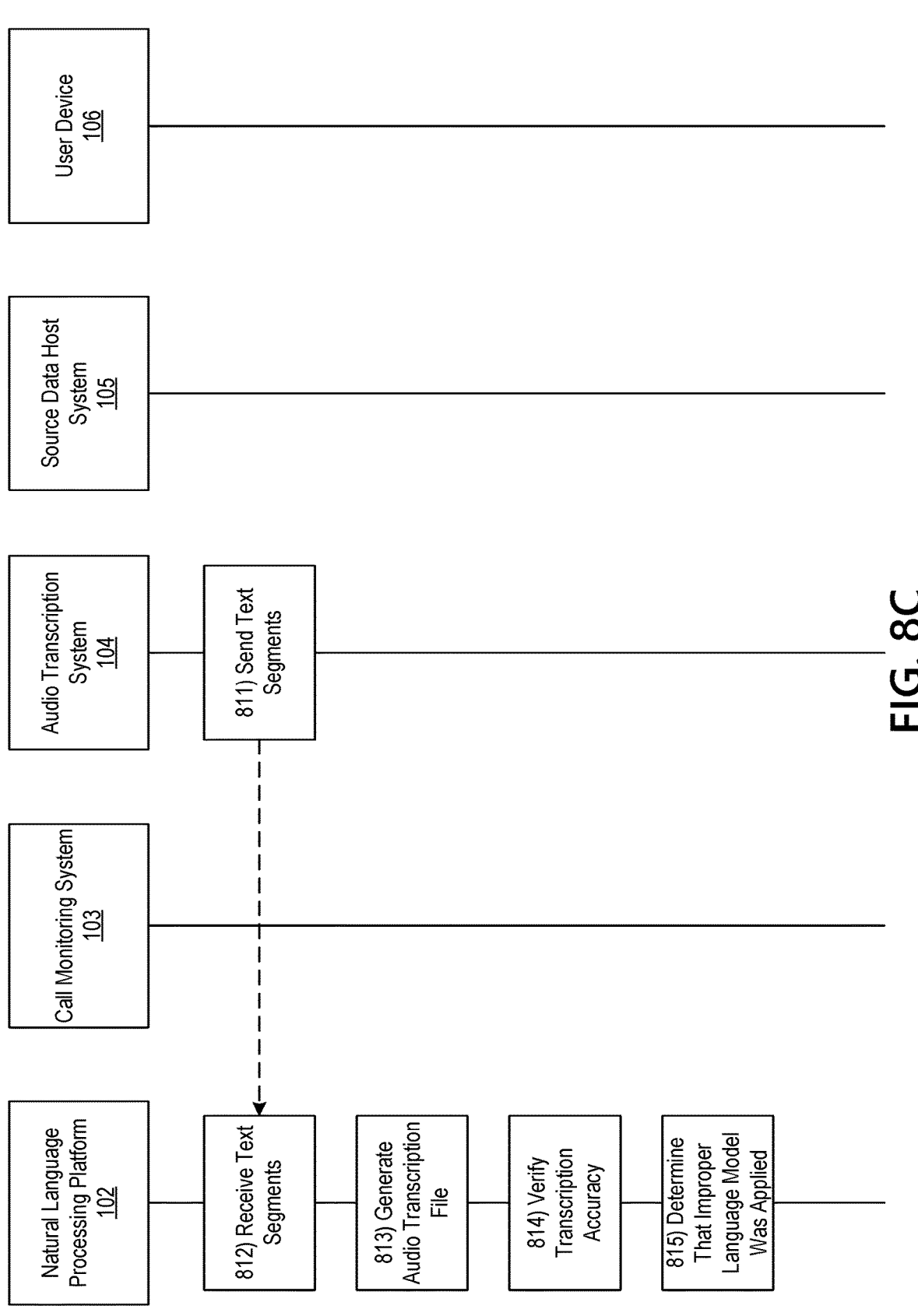

Referring to FIG. 8C, at step 811, the audio transcription system 104 may send, share, or otherwise provide the text segments to the natural language processing platform 102. In sending the text segments, the audio transcription system 104 may perform actions similar to those described above with regard to step 211. In some instances, in sending the text segments, the audio transcription system 104 may send text segments corresponding to audio from a foreign language that was transcribed using a native language transcription model.

At step 812, the natural language processing platform 102 may receive or otherwise access the text segments sent at step 811. In receiving the text segments, the audio transcription system 104 may perform actions similar to those described above with regard to step 212. In some instances, the natural language processing platform 102 may receive text segments containing text corresponding to audio from a foreign language that was transcribed using a native language transcription model.

At step 813, the natural language processing platform 102 may generate an audio transcription file based on the text segments received at step 812. In generating the audio transcription file, the natural language processing platform 102 may perform actions similar to those described above with regard to step 213. However, at step 813, the natural language processing platform 102 may generate the audio transcription file using at least some text segments containing text corresponding to audio from a foreign language that was transcribed using a native language transcription model. Additionally or alternatively, the natural language processing platform 102 may receive a document, and may apply the remaining steps (as described with regard to the audio transcription file) to the document.

At step 814, the natural language processing platform 102 may verify an accuracy of the audio transcription file. For example, the natural language processing platform 102 may apply natural language processing to the audio transcription file to determine whether or not the text in the audio transcription file is contextually accurate (e.g., makes sense, is reasonable, or the like). As an example, the natural language processing platform 102 may determine that the audio transcription file contains the following text: "How may I help?" and, in response, "My daughter backed into my car." Accordingly, in this example, the natural language processing platform 102 may determine that, when viewed in context, this text is contextually accurate and appears to be accurately transcribed. In contrast, in another example, the natural language processing platform 102 may determine that the audio transcription file contains the following text: "How may I help?" and, in response, "Summer farmhouse pickle loop." This is illustrated, for example, by graphical user interface 1105, which is shown in FIG. 11. Accordingly, in this example, the natural language processing platform 102 may determine that this text makes no sense in context and appears to be incorrectly transcribed. For example, the natural language processing platform 102 may determine that in generating this portion of the audio transcription file, the audio transcription system 104 may have applied a language transcription model associated with a first language (e.g., a native language), but the corresponding portion of the audio file may have been spoken in a second language (e.g., the audio transcription system 104 may have attempted to translate Spanish language using an English language transcription model and accordingly, generated a nonsensical portion of the transcript).

In one or more instances, in verifying the accuracy, the natural language processing platform 102 may determine an accuracy score associated with each portion of the audio transcription file (e.g., based on paragraph, sentence, text segment, or the like). In these instances, the natural language processing platform 102 may compare the accuracy scores to a predetermined accuracy threshold, which may be e.g., automatically determined to optimize a balance between computing efficiency and accuracy and/or based on user input. In one or more instances, the natural language processing platform 102 may determine that some accuracy scores exceed the predetermined accuracy threshold, but that other accuracy scores do not exceed the predetermined accuracy threshold. Alternatively, in some instances, the natural language processing platform 102 may determine that all or none of the accuracy scores exceed the predetermined accuracy threshold. This may allow the natural language processing platform 102 to detect non-native language text.

At step 815, the natural language processing platform 102 may determine, based on the comparison of the accuracy scores to the predetermined accuracy threshold at step 814, whether proper language models were applied by the audio transcription system 104 in generating the audio transcription file. For example, in some instances, the natural language processing platform 102 may determine, based on a determination at step 814 that all of the accuracy scores exceeded the predetermined accuracy threshold, that the audio transcription system 104 applied the correct language model in transcription of the entire audio file (e.g., an English transcription model was applied to an audio file containing exclusively English). Alternatively, in some instances, the natural language processing platform 102 may determine, based on a determination at step 814 that some of the accuracy scores exceeded the predetermined accuracy threshold but that others did not, that the audio transcription system 104 applied the correct language model in transcription of part of the audio file, but applied an incorrect language model in transcription of the remainder of the audio file (e.g., an English transcription model was applied to portions of the audio file containing English and other portions of the audio file containing Spanish). In yet other instances, the natural language processing platform 102 may determine, based on a determination at step 814 that none of the accuracy scores exceeded the predetermined accuracy threshold, that the audio transcription system applied an incorrect language model in transcription of the entire audio file (e.g., an English transcription model was applied to an audio file containing exclusively Spanish).

In some instances, the natural language processing platform 102 may determine that some of the accuracy scores failed the predetermined accuracy threshold, but nevertheless were within a predetermined standard deviation of the threshold warranting that they be further analyzed. For example, a non-native English speaker may speak with a heavy accent that is difficult for a transcription service to recognize and transcribe, but nevertheless the speaker may be speaking English. In these instances, the text associated with these accuracy scores may be routed for further review (e.g., automated and/or manual review).

Figure 8D:
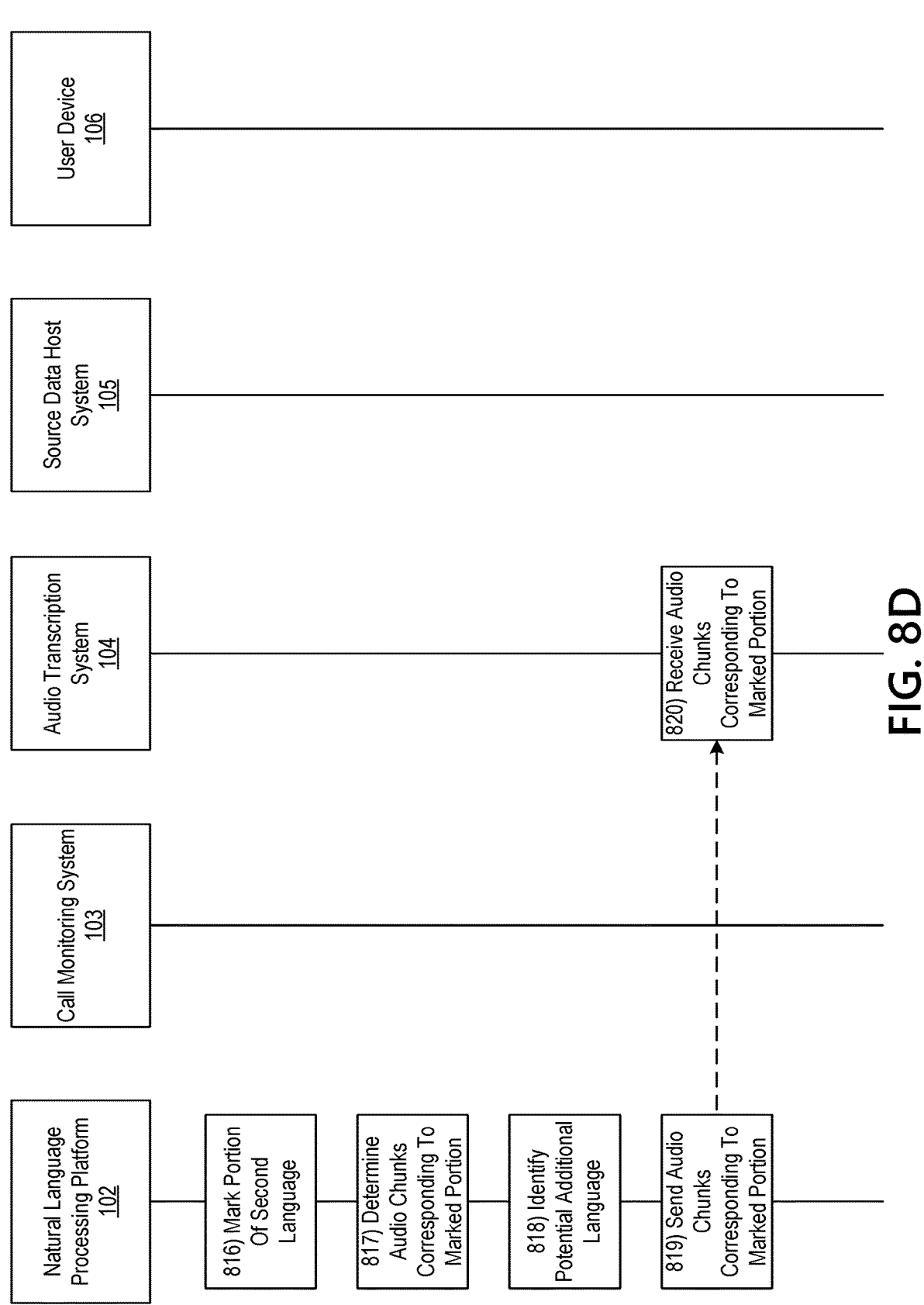

Referring to FIG. 8D, at step 816, the natural language processing platform 102 may mark one or more portions of the audio transcription file associated with accuracy scores that failed the predetermined accuracy threshold. For example, the natural language processing platform 102 may isolate portions of the audio transcription file believed to be incorrectly transcribed. In one or more instances, the natural language processing platform 102 may insert markers into the audio transcription file to indicate a beginning and end of each of the one or more portions (e.g., based on time stamps, word values, or the like). In some instances, after identifying and marking the one or more portions of the audio transcription file, the natural language processing platform 102 may send audio transcription data to the user device 106 indicating the one or more portions of the audio transcription file. In these instances, the natural language processing platform 102 may also generate and send one or more commands directing the user device 106 to generate a user interface based on the audio transcription data. Accordingly, in response to receiving the audio transcription file and the one or more commands directing the user device 106 to generate a user interface based on the audio transcription data, the user device 106 may generate a user interface similar to graphical user interface 1005, which is illustrated in FIG. 10. For example, the user device 106 may generate a warning alert to a user of the user device 106 (e.g., an agent, employee, representative, claim adjuster, or the like) indicating that the audio transcription file may contain transcription of a recording involving a foreign language, and that the user should begin to analyze the portions of the audio transcription file in the native language while the remaining text is sent for further processing. In doing so, the natural language processing platform 102 may improve the user experience at the user device 106 by providing a warning of these unusual transcripts and guiding a user (e.g., claim adjuster, representative, or the like) through the processing accordingly rather than merely providing the audio transcription file without any further context and leaving the user to figure out next steps on his or her own.

At step 817, the natural language processing platform 102 may determine audio chunks corresponding to the marked portions of the audio transcription file. In these instances, the natural language processing platform 102 may select a subset of the audio chunks generated at step 806 corresponding to the marked portions of the audio transcription file and may separate the subset of the audio chunks from a remainder of the audio chunks generated at step 806 corresponding to the unmarked portions of the audio transcription file.

At step 818, the natural language processing platform 102 may identify a potential language corresponding to the subset of the audio chunks determined at step 817. For example, the natural language processing platform 102 may maintain one or more language analysis models that apply machine learning algorithms and datasets to determine a feature vector containing a probability that the subset of the audio chunks corresponds to each of a plurality of languages. Based on the feature vector, the natural language processing platform 102 may determine a language most likely to correspond to the subset of the audio chunks (e.g., based on which language has the highest probability of correlation).

In some instances, the natural language processing platform 102 may identify a language that not commonly spoken (e.g., not one of the top ten languages spoken internationally, or the like). For example, the natural language processing platform 102 may have a stored list ranking a plurality of international languages based on their prevalence in the international community. Additionally or alternatively, the natural language processing platform 102 may have a stored list of languages that the audio transcription system 104 is configured to transcribe (e.g., maintains a transcription model for). In these instances, the natural language processing platform 102 may determine that the identified language is not commonly spoken and/or not included on the list of languages that the audio transcription system 104 is configured to transcribe. In these instances, the natural language processing platform 104 may extract and/or obscure the marked portions of the audio transcription file, and may send an indication to the user device 106 indicating that the claim adjuster should act based on the visible portions of the audio transcription file without regard to the obscured portions. In some instances, for example, the claim adjuster may be able to prompt a user for additional details based on the information they have and/or the information that is obscured. For example, the audio transcript file may read, "How can I help?" "*Obscured Text*" "I understand that you are injured, please provide more detail." Thus, although the claim adjuster might not be able to read the obscured portion of text that contains further details about the injury, he or she can clearly tell from the visible portions of the audio transcript file that there was an injury. Accordingly, the claim adjuster may understand that certain information should be collected.

In doing so, this may allow users (e.g., claim adjusters, or the like) to extract value from recordings that may otherwise be worthless (e.g., too difficult to decipher as the audio transcription file may contain too much incorrectly transcribed text). Further, this may avoid mandating the audio transcription system 104 to develop transcription models for rare languages for which only a minimal sample size of data may be available. Accordingly, the audio transcription system 104 may also conserve storage resources by avoiding storing a model for every known language and maintaining only those likely to be used on a regular basis.

It should be understood that in some instances, the language identification described with regard to step 818 may be performed by a computing device other than the natural language processing platform 102 (e.g., audio transcription system 104, or the like). In these instances, the natural language processing platform 102 may identify the marked portions of the audio transcription file, and then send an indication of the marked portions of the audio transcription file to the other computing device for further assessment (e.g., the natural language processing platform 102 may determine that part of the transcription is not English, but might not be configured to predict an alternative language).

At step 819, the natural language processing platform 102 may send the subset of the audio chunks to the audio transcription system 104. In one or more instances, the natural language processing platform 102 may generate one or more commands directing the audio transcription system 104 to transcribe the subset of the audio chunks using a language transcription model associated with the language identified at step 818. In some instances, the natural language processing platform 102 may send the subset of the audio chunks, and the one or more commands directing the audio transcription system 104 to transcribe the subset of the audio chunks using a language transcription model associated with the language identified, via the communication interface 113 and while the second wireless data connection is established.

At step 820, the audio transcription system 104 may receive the subset of the audio chunks from the natural language processing platform 102. In some instances, the audio transcription system 104 may also receive the one or more commands directing the audio transcription system 104 to transcribe the subset of the audio chunks using a language transcription model associated with the language identified at step 818. In some instances, the audio transcription system 104 may receive the subset of the audio chunks, and the one or more commands directing the audio transcription system 104 to transcribe the subset of the audio chunks using a language transcription model associated with the language identified, while the second wireless data connection is established.

Figure 8E:
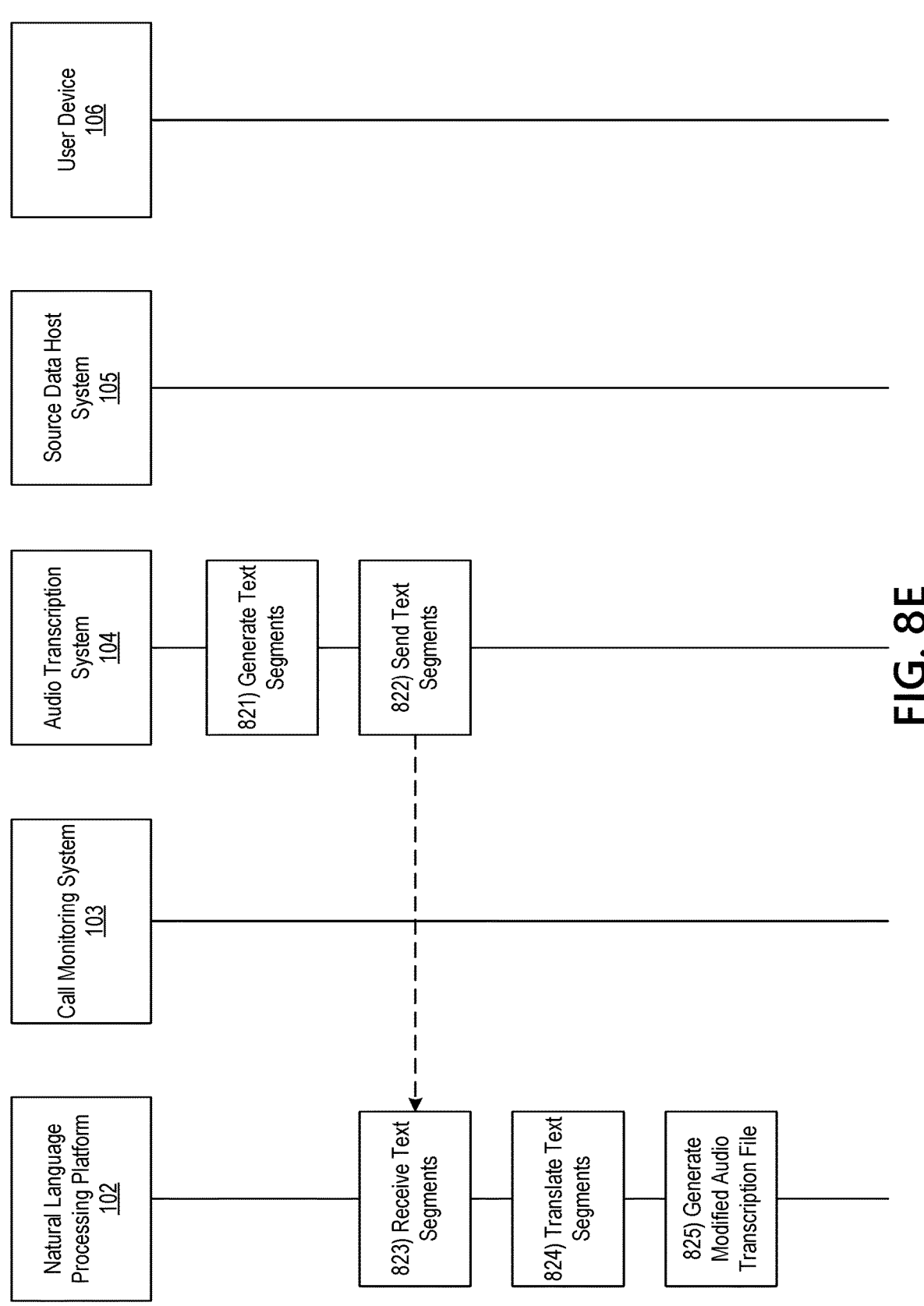

Referring to FIG. 8E, at step 821, the audio transcription system 104 may generate one or more text segments based on the subset of the audio chunks received at step 820. In one or more instances, actions performed at step 821 may be similar to those described above with regard to step 810. However, rather than processing the subset of the audio chunks using a language transcription model associated with a native language (as in step 810), the audio transcription system 104 may process the subset of the audio chunks using a language transcription model associated with the language identified at step 818, which may be a foreign language such as Spanish, Mandarin, French, German, or the like.

At step 822, the audio transcription system 104 may send the one or more text segments generated at step 821 to the natural language processing platform 102. In one or more instances, the audio transcription system 104 may send the one or more text segments to the natural language processing platform 102 while the second wireless data connection is established. In sending these text segments, the audio transcription system 104 may send text segments corresponding to speech in a foreign language that was transcribed using a foreign language transcription model corresponding to the foreign language.

At step 823, the natural language processing platform 102 may receive the one or more text segments sent at step 822. In one or more instances, the audio transcription system 104 may receive the one or more text segments via the communication interface and while the second wireless data connection is established. In receiving the one or more text segments, the natural language processing platform 102 may receive one or more text segments transcribed in the language identified at step 818. In receiving the text segments, the natural language processing platform 102 may receive text segments corresponding to speech in a foreign language that was transcribed using a foreign language transcription model corresponding to the foreign language.

At step 824, the natural language processing platform 102 may translate the one or more text segments received at step

823 into the native language (e.g., the language associated with the remainder of the text), resulting in one or more translated text segments. For example, the natural language processing platform 102 may translate one or more Spanish text segments, received at step 823, into English. In some instances, the natural language processing platform 102 may translate the one or more text segments and in other instances, translation may be performed by one or more additional computing systems (e.g., a translation server or the like). In these instances, the natural language processing platform 102 may send the one or more text segments to the one or more additional computing systems and may receive, in response, one or more translated text segments.

At step 825, the natural language processing platform 102 may generate a modified audio transcription file based on the one or more translated text segments. In some instances, to generate the modified audio transcription file, the natural language processing platform 102 may stitch together the unmarked portions of the original audio transcription file (e.g., the portions of the original audio transcription file associated with accuracy scores that exceeded the predetermined accuracy threshold at step 814 and thus were determined to be in the native language) and the translated one or more text segments. For example, the natural language processing platform 102 may extract the unmarked portions from the original audio transcription file and may generate a modified audio transcription file by inserting the unmarked portions from the original audio transcription file and the translated one or more text segments into the modified audio transcription file based on timestamps, word value information, or the like.

In one or more instances, once the natural language processing platform 102 generates the modified audio transcription file, the natural language processing platform 102 may determine accuracy scores for various portions of the modified audio transcription file (as described above at step 814 with regard to the original audio transcription file). In these instances, the natural language processing platform 102 may compare the accuracy scores for the various portions of the modified audio transcription file to the predetermined accuracy threshold. In some instances, the natural language processing platform 102 may compare the accuracy scores for each portion of the modified audio transcription file to the predetermined accuracy threshold. In other instances, to conserve computing resources, the natural language processing platform 102 may compare only portions of the modified audio transcription file corresponding to the translated one or more text segments to the predetermined accuracy threshold. Furthermore, in some instances, the natural language processing platform 102 may only determine accuracy scores for the portions of the modified audio transcription file associated with the translated one or more segments.

In doing so, the natural language processing platform 102 may determine whether the modified audio transcription file makes sense in context, or whether it once again contains portions that are nonsensical as a result of improper transcription. If the natural language processing platform 102 determines that the audio file was once again incorrectly transcribed, the natural language processing platform 102 may return to step 818 to identify another language for use in the transcription. In these instances, the natural language processing platform 102 may update one or more machine learning datasets used to identify the language at step 818 based on the incorrect identification. In doing so, the natural language processing platform 102 may dynamically improve its language identification models and increase its future rate of successful language identification. If the natural language processing platform 102 determines that the audio file has now been correctly transcribed, the natural language processing platform may proceed to step 826.

Figure 8F:
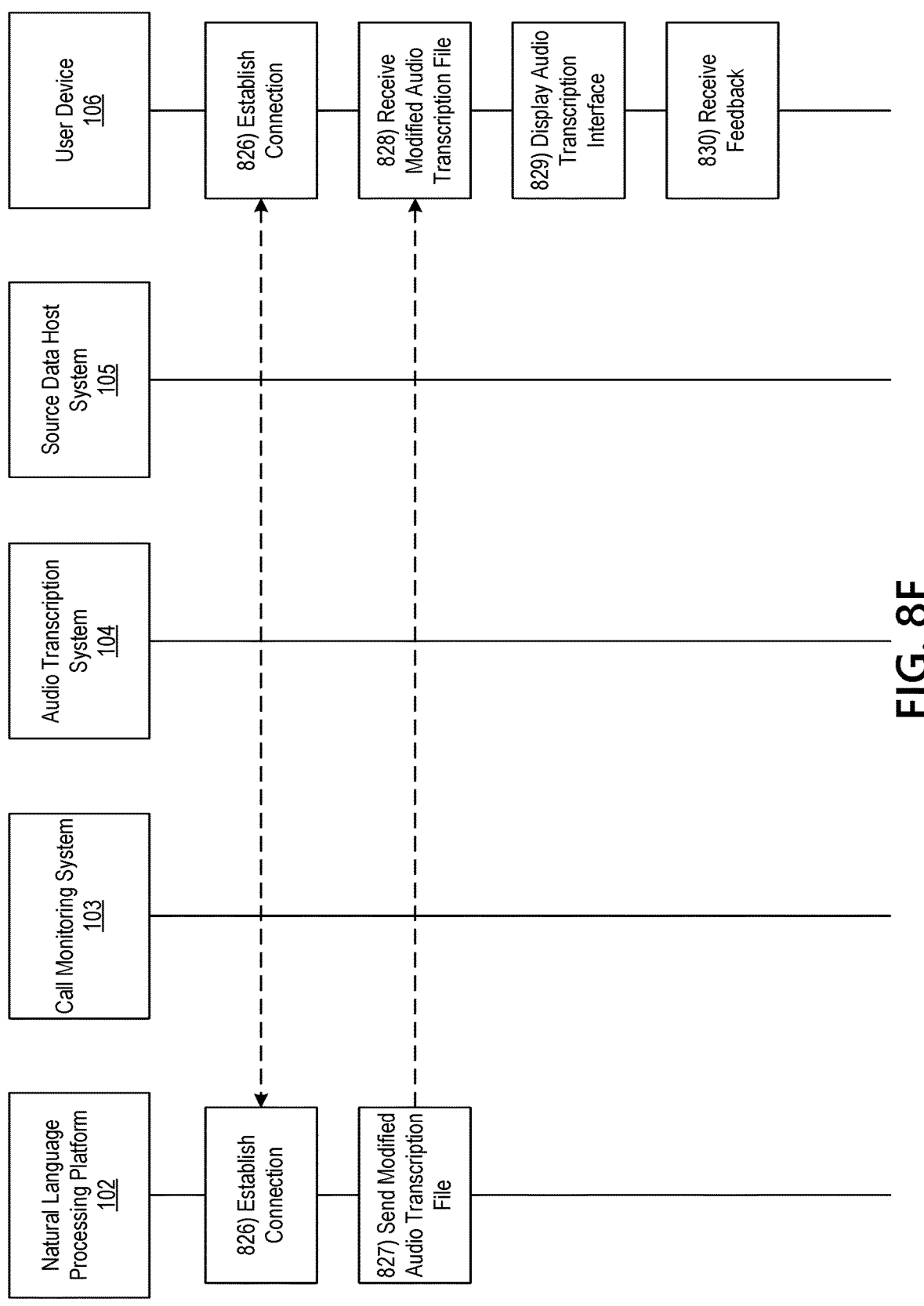

Referring to FIG. 8F, at step 826, the natural language processing platform 102 may establish a connection with the user device 106. In doing so, the natural language processing platform 102 may perform actions similar to those described at step 229 with regard to the fourth wireless data connection.

At step 827, the natural language processing platform 102 may send the modified audio transcription file, generated at step 825, to the user device 106. In doing so, the natural language processing platform may perform actions similar to those described at step 230. For example, in some instances, along with or in addition to the modified audio transcription file, the natural language processing platform 102 may send user interface information that may be used by the user device 106 to generate a user interface. In these instances, the natural language processing platform 102 may send one or more commands directing the user device 106 to display a user interface based on the user interface information.

At step 828, the user device 106 may receive the modified audio transcription file. In one or more instances, in receiving the modified audio transcription file, the user device 106 may perform one or more actions similar to those described with regard to step 231.

At step 829, the user device 106 may display an audio transcription interface. For example, the user device 106 may display the text of the modified audio transcription file. In one or more instances, in generating the audio transcription interface, the user device 106 may generate a user interface similar to graphical user interface 1205, which is shown in FIG. 12. For example, the user device 106 may display text of the audio file that has been properly transcribed in its native language and then translated accordingly. Thus, the result may resemble graphical user interface 1205 rather than graphical user interface 1105, which is not practically useful for a user of the user device 106 or a customer associated with the audio file.

At step 830, the user device 106 may receive feedback from a user. For example, the user device 106 may receive feedback indicating whether the displayed transcript was successfully transcribed and translated (e.g., as shown in FIG. 12) or whether errors were made (e.g., as shown in FIG. 11).

Figure 8G:
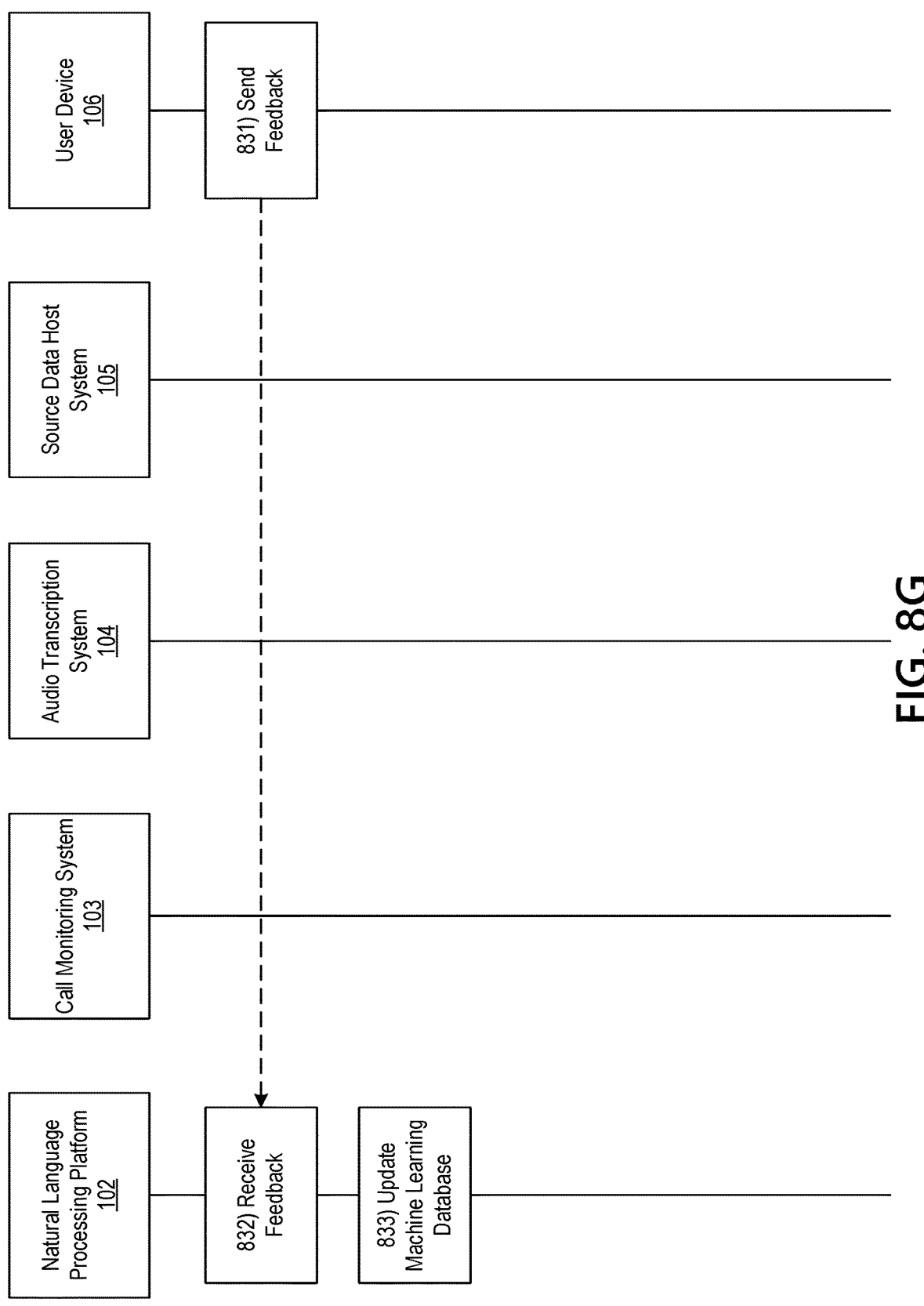

Referring to FIG. 8G, at step 831, the user device 106 may send the feedback, received at step 830, to the natural language processing platform 102. For example, the user device 106 may send feedback that the displayed transcript was successfully transcribed and translated, and thus that the natural language processing platform 102 should reinforce the datasets used in processing (e.g., for identifying the language, assigning accuracy values, or the like).

Additionally or alternatively, the user device 106 may send feedback that the displayed transcript contained errors, and thus that the natural language processing platform 102 should adjust the datasets used in processing accordingly. In doing so, the natural language processing platform 102 may be able to dynamically improve and to increase accuracy in future processing. In one or more instances, the user device 106 may send the feedback while the fourth wireless data connection is established.

At step 832, the natural language processing platform 102 may receive the feedback sent at step 831. In one or more instances, the natural language processing platform 102 may receive the feedback via the communication interface 113 and while the fourth wireless data connection is established.

At step 833, the natural language processing platform 102 may update one or more machine learning datasets based on the feedback received at step 832. For example, the natural language processing platform may update the machine learning engine 112c and/or machine learning datasets stored in natural language processing module 112a and/or natural language processing database 112b that may be used in language identification at step 818, accuracy determination at steps 814-815, or the like.

It should be understood that in some instances, the illustrative event sequence described herein may occur in real time as a call is occurring. For example, a call may be transcribed in real time, and may pull in data from other sources in real time based on the transcription. For example, a policy number may be transcribed, and additional policy details may be determined based on the policy number and subsequently presented to a claim adjuster in real time during the call. It should also be understood that although the illustrative event sequence describes an audio file, the methods and systems described herein could apply to a text and/or instant messaging chat exchange.

Figure 9:
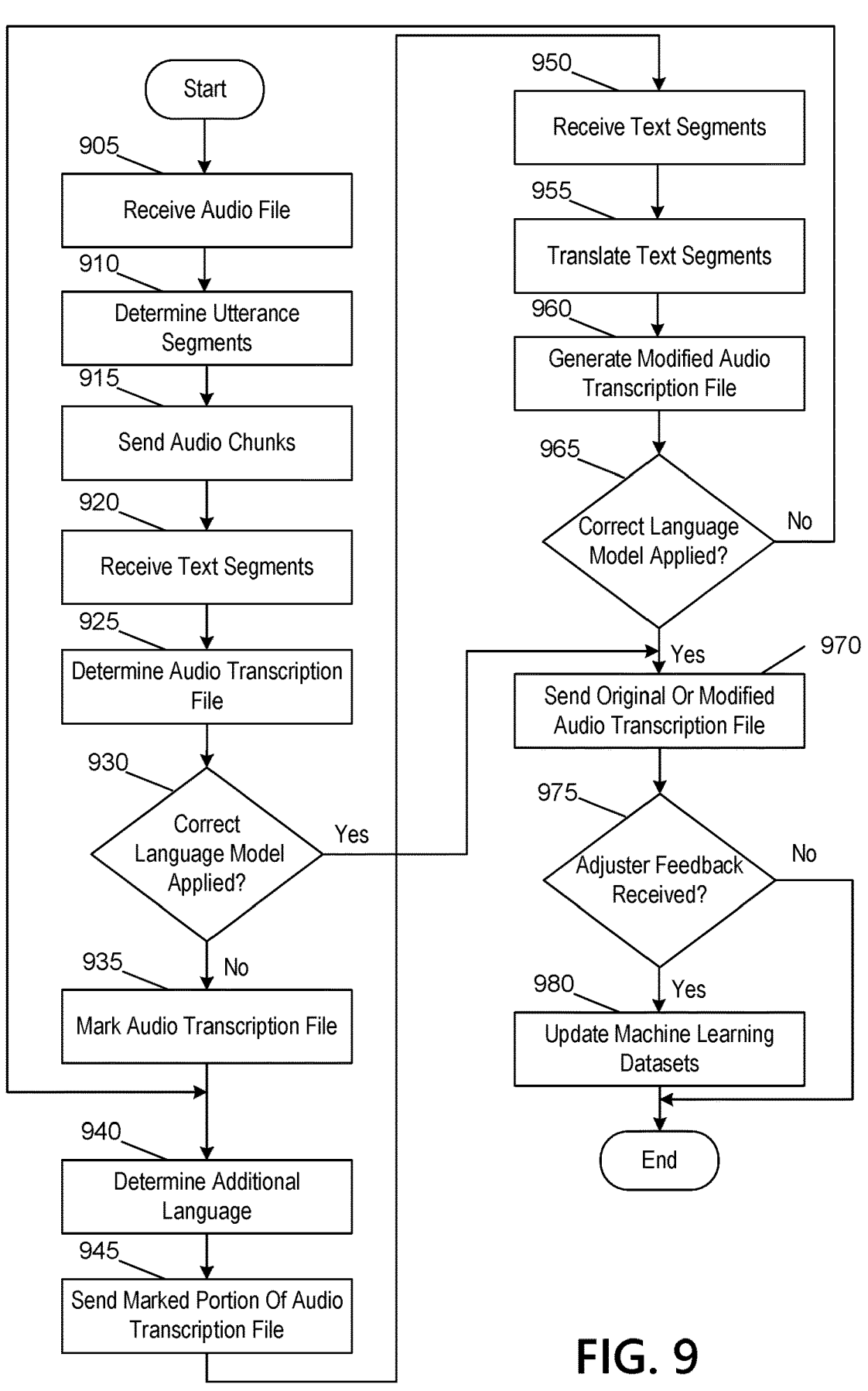
FIG. 9 depicts an illustrative method for performing claim transcription and translation using improved natural lan-

FIG. 9 depicts an illustrative method for performing claim transcription and translation using improved natural language processing techniques in accordance with one or more example embodiments. Referring to FIG. 9, at step 905, a computing platform having a processor, a communication interface, and a memory storing computer-readable instructions may receive an audio file. At step 910, the computing platform may determine one or more utterance segments based on the audio file. At step 915, the computing platform may send one or more audio chunks, corresponding to the utterance segments, for transcription. At step 920, the computing platform may receive one or more text segments each corresponding to an utterance segment. At step 925, the computing platform may determine, based on the one or more text segments, an audio transcription file. At step 930, the computing platform may determine whether the correct language transcription model was applied during generation of the one or more text segments. If the computing platform determines that the correct language transcription model was applied, the computing platform may proceed to step 970. If the computing platform determines that the correct language transcription model was not applied, the computing platform may proceed to step 935.

At step 935, the computing platform may mark portions of the audio transcription file identified as incorrectly transcribed. At step 940, the computing platform may determine a language model that should be used in transcription of the marked portions of the audio transcription file. At step 945, the computing platform may send the marked portions of the audio transcription file back for transcription using the identified language model. At step 950, the computing platform may receive additional text segments corresponding to the marked portions of the audio transcription file. At step 955, the computing platform may translate the text segments corresponding to the marked portions of the audio transcription file. At step 960, the computing platform may generate a modified audio transcription file based on the translated text segments and the unmarked portions of the audio transcription file. At step 965, the computing platform may determine if the correct language model was applied in determining the additional text segments. If the computing platform determines that the correct language model was not applied, the computing platform may return to step 940. If the computing platform determines that the correct language model was applied, the computing platform may proceed to step 970.

At step 970, the computing platform may send either the original or modified audio transcription file (depending on the determination made at step 930). At step 975, the computing platform may determine whether any feedback was received. If the computing platform determines that feedback was not received, the method may end. If the computing platform determines that adjuster feedback was received, the computing platform may proceed to step 980. At step 980, the computing platform may update one or more machine learning datasets used in the illustrative method.

Accordingly, by extracting these text segments, the computing platform may save time spent in manual claim review, and may facilitate automation of the claim processing. Furthermore, the computing platform may increase transcription accuracy by recognizing incorrect transcription (e.g., due to transcription in an incorrect language). In addition, the systems and methods described herein may allow claim adjusters to extract value from claim calls regardless of the language in which they are conducted. Accordingly, the disclosure presented herein provides technical solutions to the technical problems associated with inefficiencies of current claim processing techniques.

It should be understood that while the systems and methods described herein in the illustrative event sequence, system diagrams, and methods, are primarily described in the context of claim processing, the systems and methods described herein may be applied to any number of other fields and applications to assist with full and/or partial automation of processes based on natural language processing without departing from the scope of the disclosure. Accordingly, the outlined systems and methods may be applied to a wide variety of use cases beyond claim processing and may be applied by any user/individual (e.g., not merely a claim adjuster). For example, the outlined systems and methods may be applied to a call center handling customer calls related to processing of any customer issue or complaints. As a further specific example, the systems and methods may be applied to documents. For example, the documents may be processed in an identical or substantially similar method to the audio transcription file as described above. For example, rather than performing steps 201-213 and/or 801-813 to generate an audio transcription file, the natural language processing platform 102 may receive a document, and may perform the remaining steps as described (or with necessary modifications) with regard to the document. In some instances, the document use case and the voice recording use case may be applied together sequentially and/or in parallel. For example, documents may be analyzed using natural language processing and/or optical character recognition and may be used to assist and/or provide guidance to an individual (e.g., such as a claim processor) in real time.

Furthermore, it should be understood that while the application primarily discusses calls, the systems and methods described herein may apply to any type of communication (e.g., video, audio, text, instant message, electronic communication, or the like) between any type of user (e.g., any call center, employee, individual, or the like). It should also be understood that the methods described herein, such as the transcription/translation service may, in some instances, occur in real time as a call is happening.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A computing platform comprising:

at least one processor;

a communication interface communicatively coupled to the at least one processor; and memory storing computer-readable instructions that, when executed by the at least one processor, cause the computing platform to:

generate an audio transcription file based on one or more text segments of an audio file;

assign a category to each word in the audio transcription file;

determine that a number in the audio transcription file corresponds to a transaction number by analyzing number patterns and eliminating repetitive numbers to match an expected transaction number format;

determine, based at least in part on the transaction number, identifying information indicative of a user account;

request additional information associated with the user account;

send user interface information, generated based on the category assigned to each word in the audio transcription file and the additional information, to a user device along with one or more commands directing the user device to generate a user interface based on the user interface information, wherein sending the one or more commands directing the user device to generate the user interface based on the user interface information causes the user device to generate and display the user interface; and receive a selection of text from the audio transcription file, via the user interface, and a request to play a portion of the audio file corresponding to the selected text.

2. The computing platform of claim 1, wherein the memory stores additional computer-readable instructions that, when executed by the at least one processor, further cause the computing platform to:

identify, in the audio transcription file, personal information, wherein the personal information comprises one or more of: credit card information, bank account information, a social security number, driver's license information, or a tax identifier; and redact the personal information from the audio transcription file.

3. The computing platform of claim 1, wherein determining that a number in the audio transcription file corresponds to a transaction number, comprises:

determining that a number in the audio transcription file matches a pattern corresponding to a transaction number based on one or more of: a number of digits, a digit pattern, or a character pattern, extracting a segment from the audio transcription file corresponding to a predetermined character length window, analyzing the extracted segment to identify that a length of numbers included in the extracted segment is greater than or equal to an amount of numbers in a transaction number, eliminating identified repetition in the extracted segment until the length of numbers is reduced to the amount of numbers in the transaction number.

4. The computing platform of claim 3, wherein the transaction number is broken up by one or more words and wherein identifying the transaction number comprises determining, based on the length of numbers, that the extracted segment contains the transaction number.

5. The computing platform of claim 3, wherein the computing platform is configured to implement logic to interpret number variations in the audio transcription file, wherein the number variations comprise leading zeros or varied number pronunciations.

6. The computing platform of claim 1, wherein the audio file comprises a first channel and a second channel, and the first channel includes speech from a first individual and the second channel includes speech from a second individual.

7. The computing platform of claim 1, wherein each of the one or more text segments includes one or more embedded timestamps or speaker identifiers, wherein generating the audio transcription file comprises:

stitching together the one or more text segments using the one or more embedded timestamps or speaker identifiers, and linking each of the one or more text segments to one or more corresponding audio chunks, wherein a user input received at a portion of the audio transcription file corresponding to a particular text segment may result in audio output of one or more particular audio chunks used to generate the particular text segment.

8. The computing platform of claim 1, wherein assigning the categories to each word in the audio transcription file comprises, for each word:

computing, using a transfer learning model, a probability that the word corresponds to each of a plurality of categories, wherein the plurality of categories comprises: preamble, loss details, injury, damages, contact details, next steps, sign off, or other:

generating a vector including the computed probabilities that the word corresponds to each of the plurality of categories, wherein the plurality of categories comprises: preamble, loss details, injury, damages, contact details, next steps, sign off, or other;

generating a vector including the computed probabilities that the word corresponds to each of the plurality of categories;

assigning, to the word, a category corresponding to a largest computed probability included in the vector; and tagging the word with an indication of the assigned category.

9. The computing platform of claim 8, wherein the memory stores additional computer-readable instructions that, when executed by the at least one processor, further cause the computing platform to tag, within the audio transcription file, one or more sections, wherein each of the one or more tagged sections includes words corresponding to a common category.

10. The computing platform of claim 8, wherein the memory stores additional computer-readable instructions that, when executed by the at least one processor, further cause the computing platform to modify an assigned category of a word based on a category of one or more adjacent words.

11. The computing platform of claim 8, wherein each of the plurality of categories corresponds to a priority value, and wherein assigning the category to the word is based, at least in part, on the priority value.

12. The computing platform of claim 8, wherein the memory stores additional computer-readable instructions that, when executed by the at least one processor, further cause the computing platform to generate, for each of the plurality of categories, a count, wherein the counts correspond to a number of times in the audio transcription file a word in the corresponding category appears.

13. The computing platform of claim 1, wherein the memory stores additional computer-readable instructions that, when executed by the at least one processor, further cause the computing platform to: identify, using the audio transcription file, one or more of: a call type, a loss location, or additional participants corresponding to the audio transcription file.

14. The computing platform of claim 1, wherein sending the one or more commands directing the user device to generate the user interface based on the user interface information causes the user device to generate and display an interface that includes:

a line by line script indicating words spoken by a particular speaker, an indication of the particular speaker, and a time at which the words were spoken, and a series of selectable objects each corresponding to one of a plurality of categories, wherein selection of one of the selectable objects causes words in the line by line script, which correspond to a category of the one of the selectable objects, to be emphasized.

15. The computing platform of claim 14, wherein the audio file comprises a live audio stream, and wherein the user interface is displayed in real time during the live audio stream.

16. A non-transitory computer-readable medium having stored thereon instructions that when executed by one or more processors of a computing platform cause the computing platform to perform operations comprising:

generating an audio transcription file based on one or more text segments of an audio file;

assigning a category to each word in the audio transcription file;

determining that a number in the audio transcription file corresponds to a transaction number by analyzing number patterns and eliminating repetitive numbers to match an expected transaction number format determining, based at least in part on the transaction number, identifying information indicative of a user account;

requesting additional information associated with the user account;

sending user interface information, generated based on the category assigned to each word in the audio transcription file and the additional information, to a user device along with one or more commands directing the user device to generate a user interface based on the user interface information, wherein sending the one or more commands directing the user device to generate the user interface based on the user interface information causes the user device to generate and display the user interface; and receiving a selection of text from the audio transcription file, via the user interface, and a request to play a portion of the audio file corresponding to the selected text.

17. The non-transitory computer-readable medium of claim 16, wherein the instructions cause the computing platform to perform further operations comprising:

identifying, in the audio transcription file, personal information, wherein the personal information comprises one or more of: credit card information, bank account information, a social security number, driver's license information, or a tax identifier; and redacting the personal information from the audio transcription file.

18. The non-transitory computer-readable medium of claim 16, wherein the instructions for determining that a number in the audio transcription file corresponds to a transaction number comprise instructions that cause the computing platform to perform further operations comprising:

determining that a number in the audio transcription file matches a pattern corresponding to a transaction number based on one or more of: a number of digits, a digit pattern, or a character pattern, extracting a segment from the audio transcription file corresponding to a predetermined character length window, analyzing the extracted segment to identify that a length of numbers included in the extracted segment is greater than or equal to an amount of numbers in a transaction number, eliminating identified repetition in the extracted segment until the length of numbers is reduced to the amount of numbers in the transaction number.

19. The non-transitory computer-readable medium of claim 16, wherein the transaction number is broken up by one or more words and wherein identifying the transaction number comprises determining, based on the length of numbers, that the extracted segment contains the transaction number.

20. The non-transitory computer-readable medium of claim 16, wherein the computing platform is configured to implement logic to interpret number variations in the audio transcription file, wherein the number variations comprise leading zeros or varied number pronunciations.

* * * * *